Figure 5:
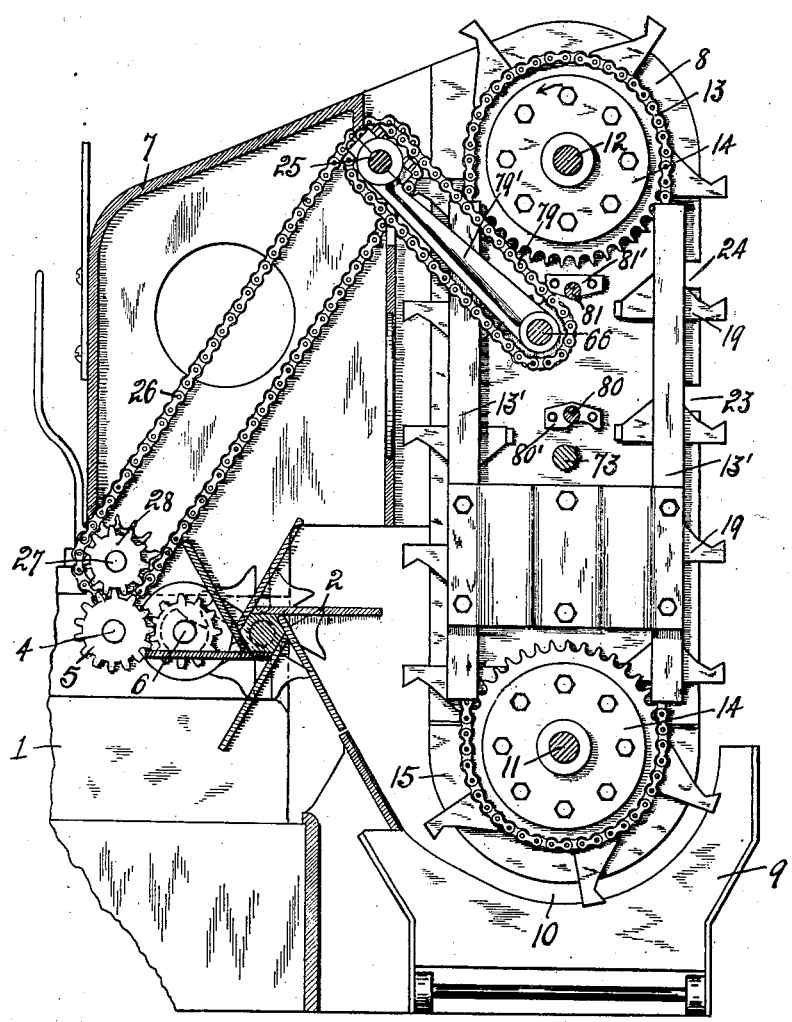

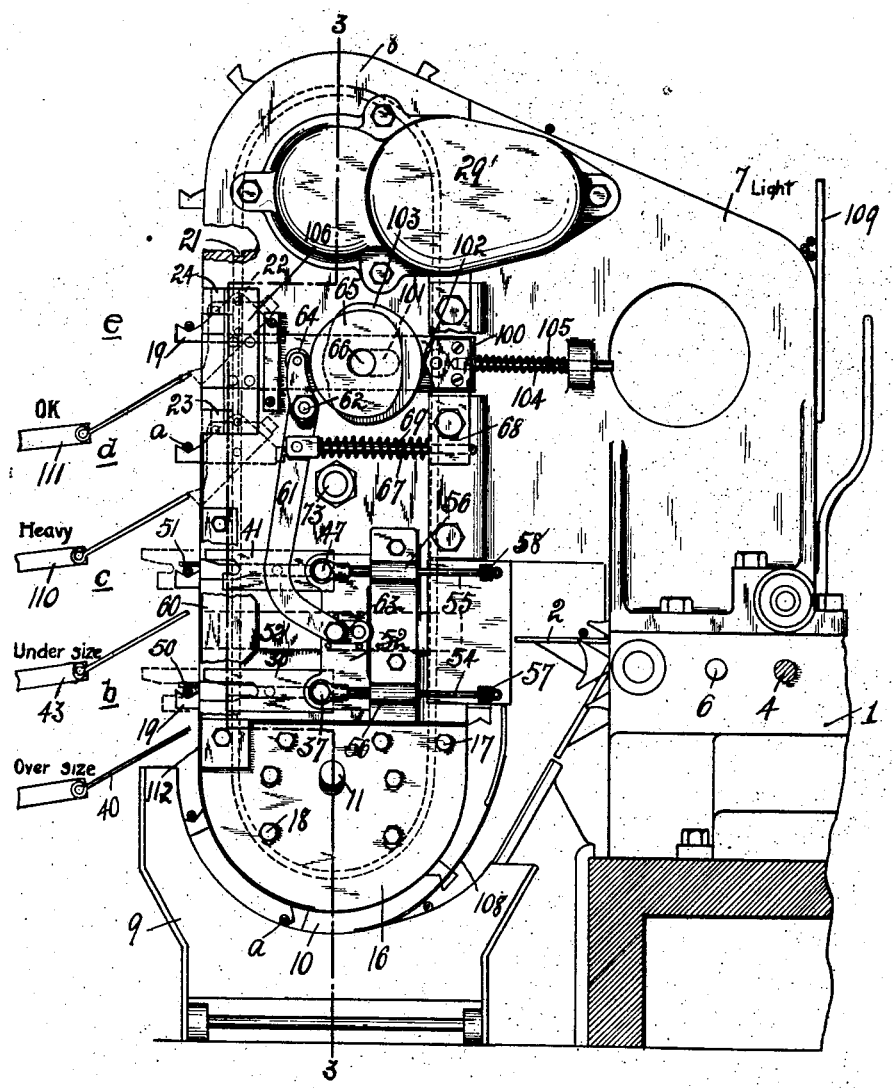

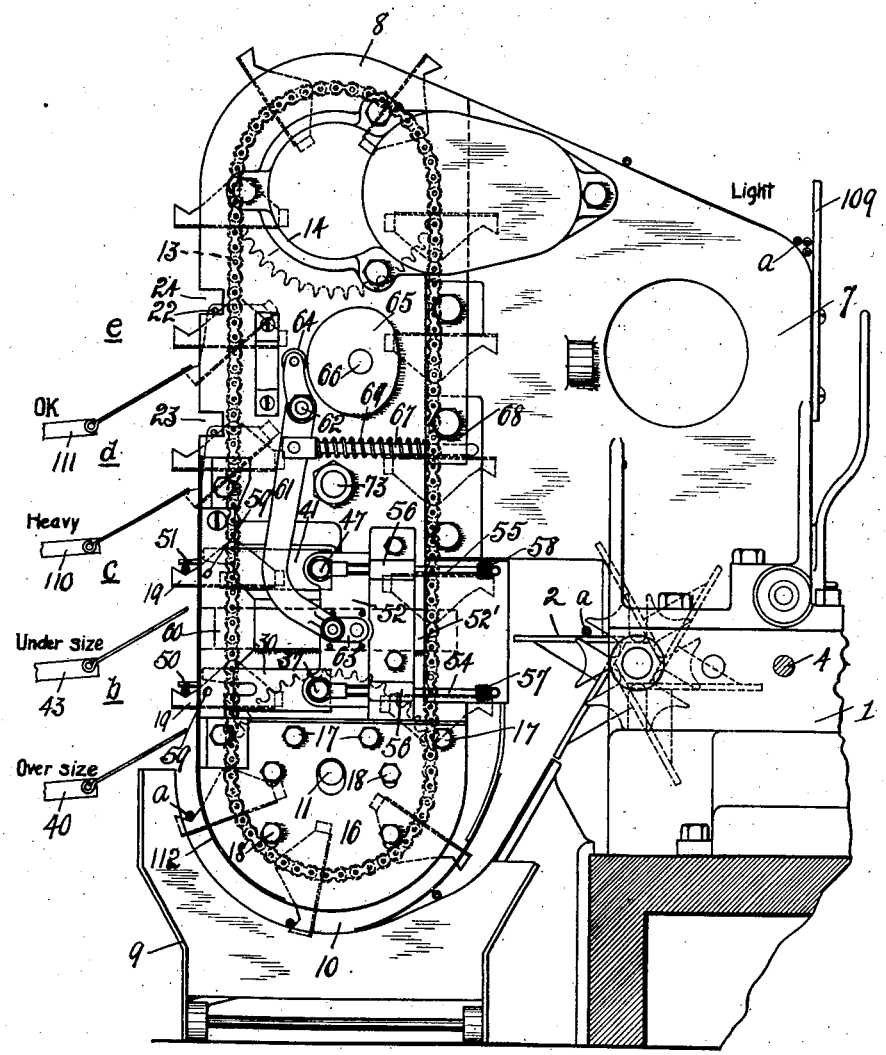

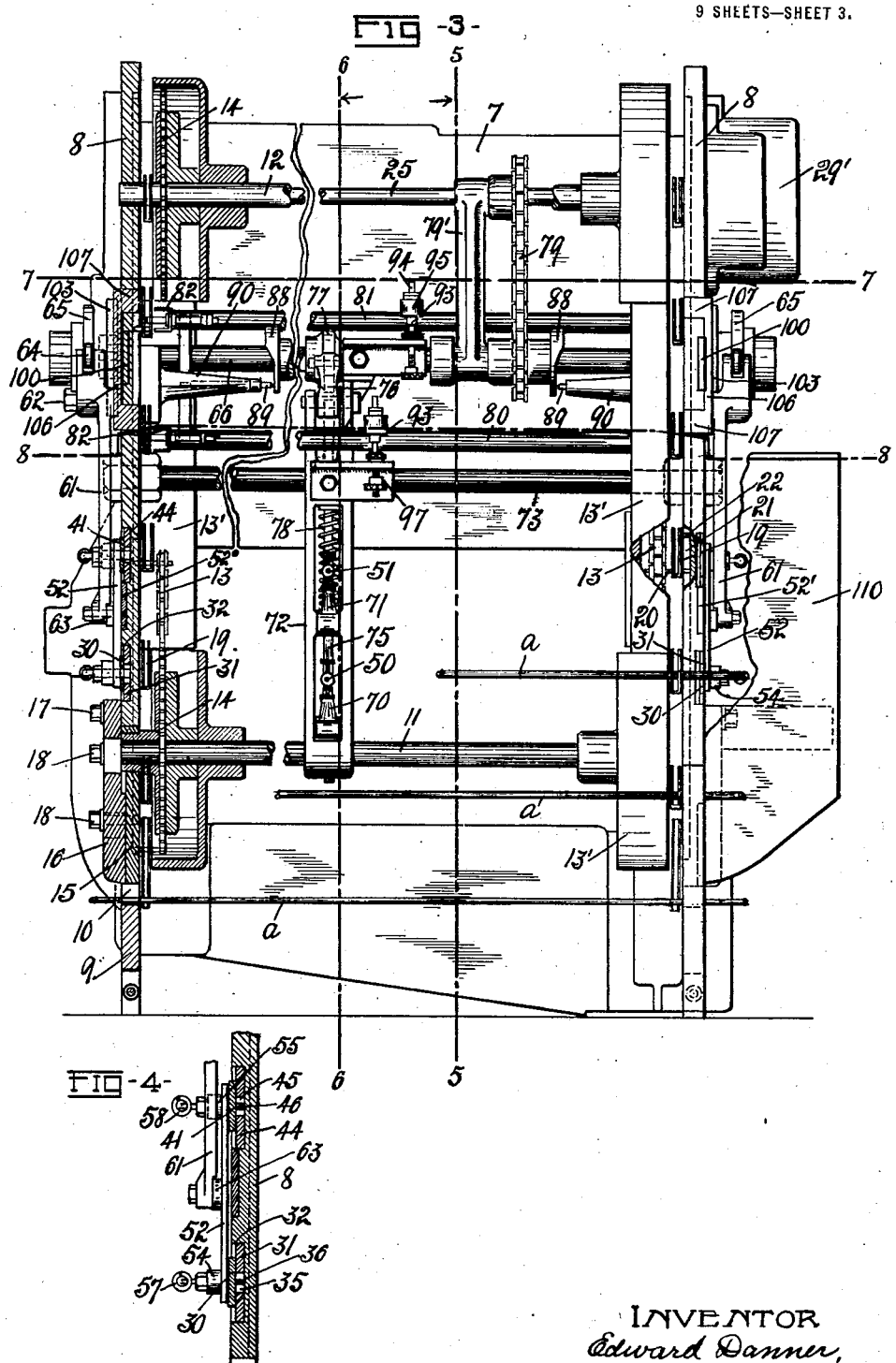

E. DANNER.
ASSORTING MACHINE.
APPLICATION FILED SEPT. 19, 1916.

1,309,086.

Patented July 8, 1919.
9 SHEETS—SHEET 4.

INVENTOR.
Edward Danner,
By Owen, Owen & Crampton,
His attys.

E. DANNER.
ASSORTING MACHINE.
APPLICATION FILED SEPT. 19, 1918.

1,309,086.

Patented July 8, 1919.
9 SHEETS—SHEET 5.

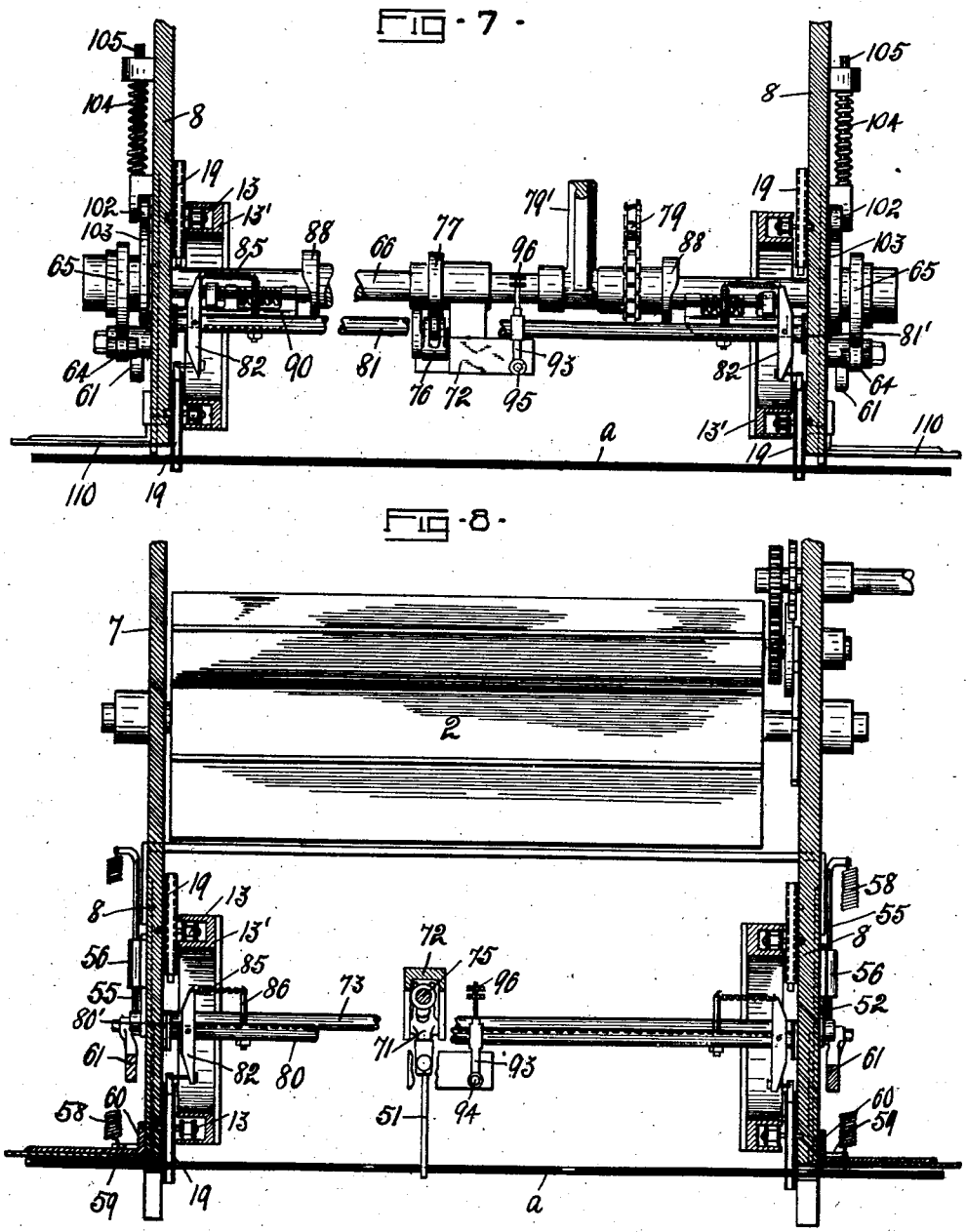

E. DANNER.
ASSORTING MACHINE.
APPLICATION FILED SEPT. 19, 1918.
1,309,086.
Patented July 8, 1919.
9 SHEETS—SHEET 7.
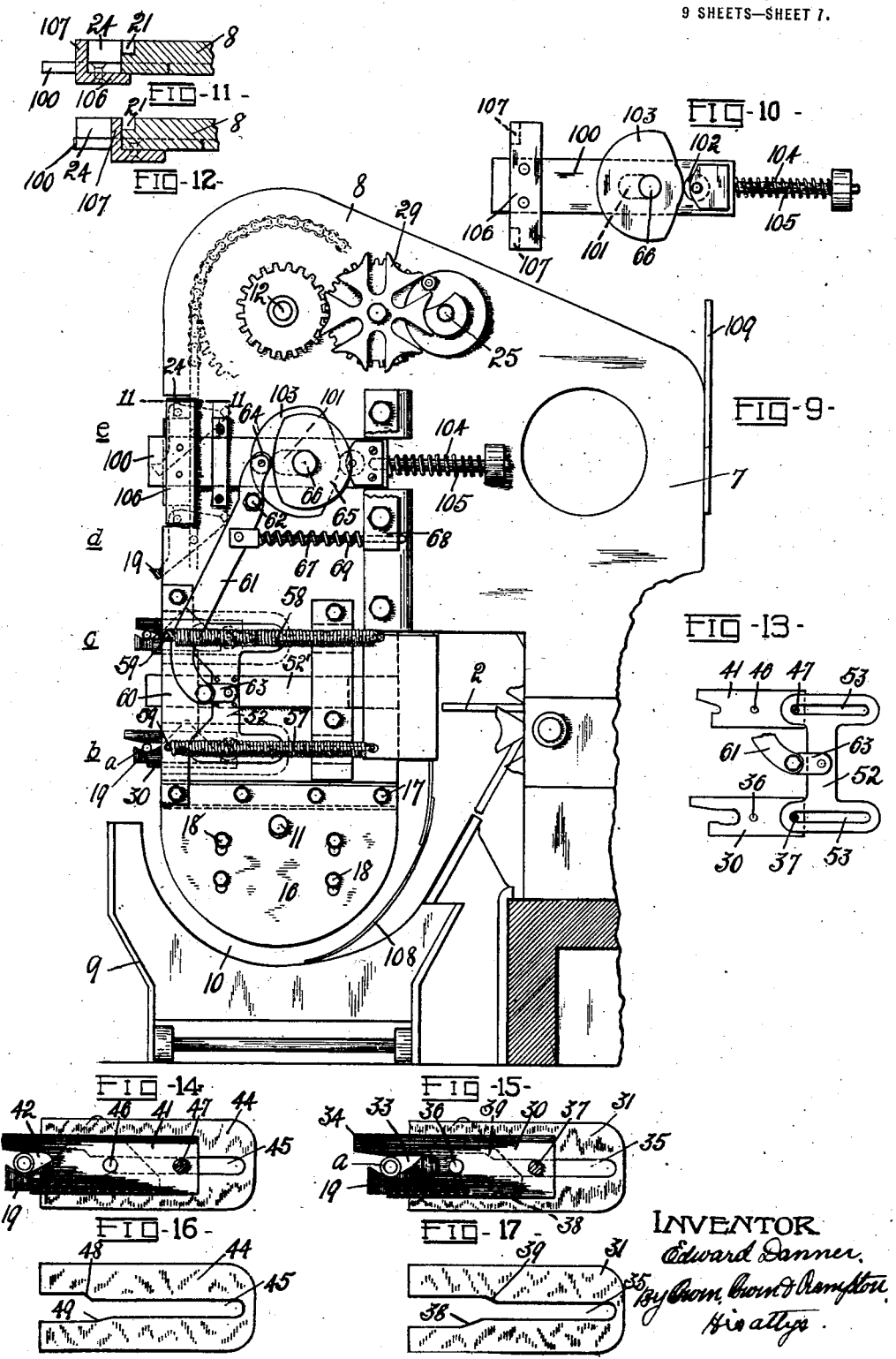
INVENTOR
Edward Danner.
By Owen, Owen & Crompton
His attys.

E. DANNER.
ASSORTING MACHINE.
APPLICATION FILED SEPT. 19, 1918.
1,309,086.
Patented July 8, 1919.
9 SHEETS—SHEET 8.
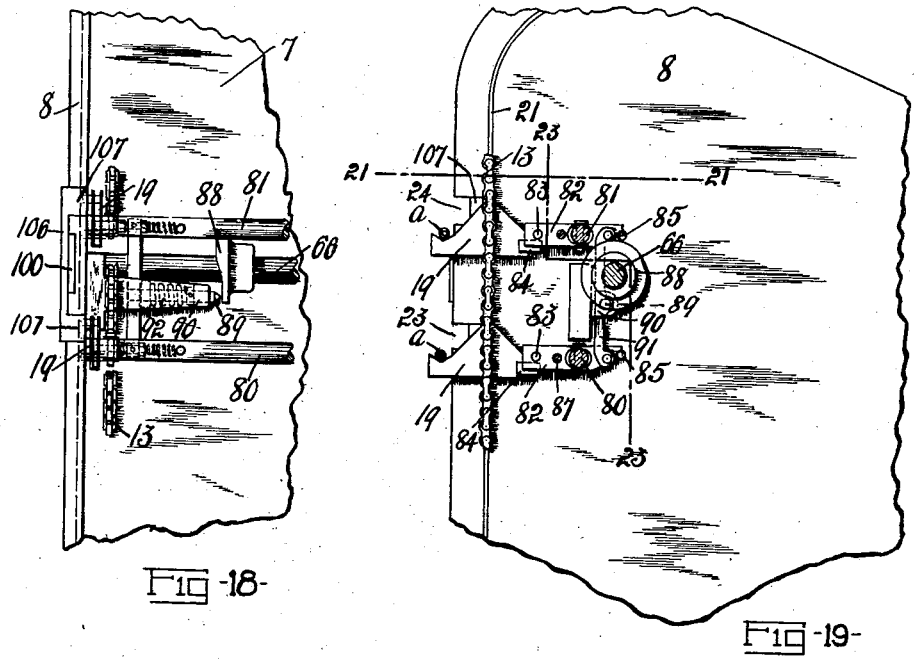
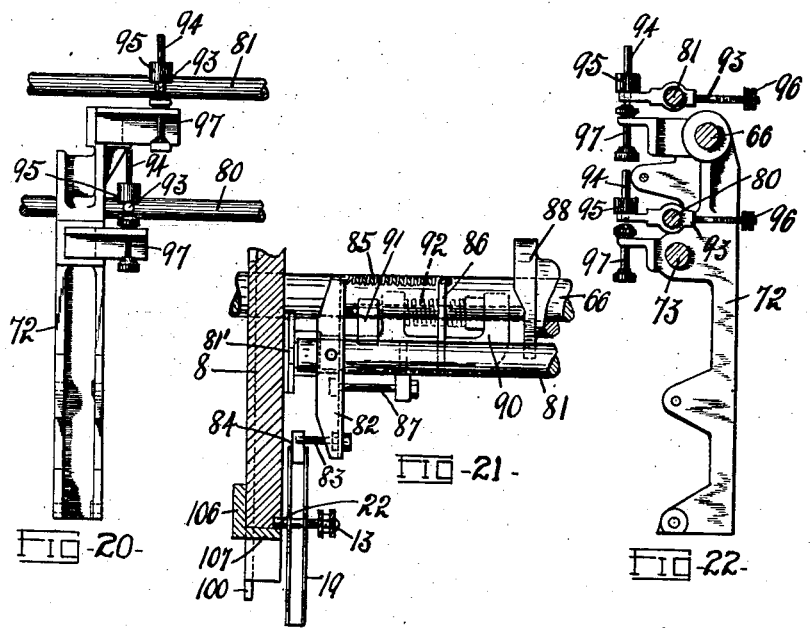
INVENTOR
Edward Danner.
By Owen, Owen & Crampton,
His attys.

E. DANNER.
ASSORTING MACHINE.
APPLICATION FILED SEPT. 19, 1918.
1,309,086.
Patented July 8, 1919.
9 SHEETS—SHEET 9.
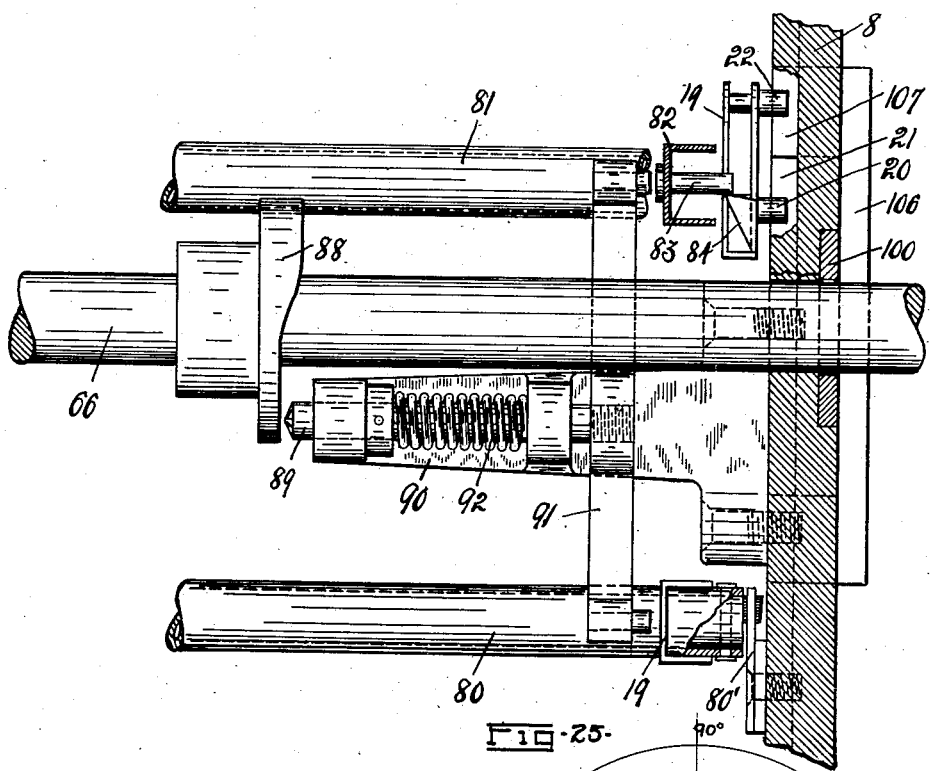
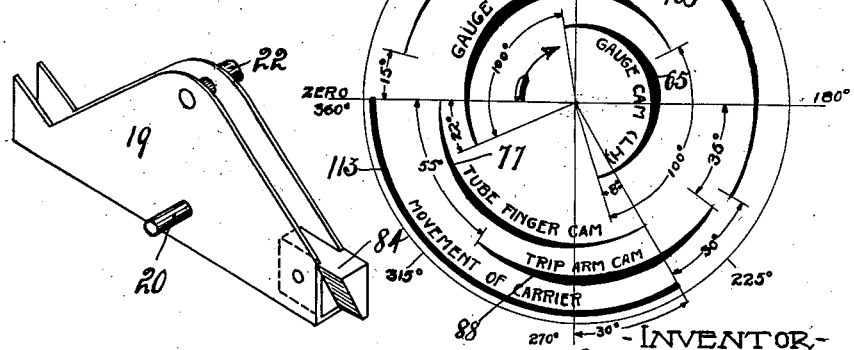

UNITED STATES PATENT OFFICE.

EDWARD DANNER, OF TOLEDO, OHIO, ASSIGNOR TO THE LIBBEY GLASS COMPANY, OF TOLEDO, OHIO, A CORPORATION OF OHIO.

ASSORTING-MACHINE.

1,309,086.   Specification of Letters Patent.   Patented July 8, 1919.

Application filed September 19, 1918. Serial No. 254,810.

*To all whom it may concern:*

Be it known that I, EDWARD DANNER, a citizen of the United States, and a resident of Toledo, in the county of Lucas and State of Ohio, have invented a certain new and useful Assorting-Machine; and I do hereby declare the following to be a full, clear, and exact description of the invention, such as will enable others skilled in the art to which it appertains to make and use the same, reference being had to the accompanying drawings and to the characters of reference marked thereon, which form a part of this specification.

This invention relates to machines for assorting articles both as to size and weight, and is particularly designed for attachment to and use in connection with the machine shown and described in my former United States Letters Patent No. 1,220,201, dated March 27, 1917, whereby glass canes or tubing is continuously drawn from a forming source and successively severed into sections of predetermined length by said machine, and the sections then delivered to my present machine and assorted thereby as to cross-sectional size and weight.

The object of my invention is the provision of a simple and efficient machine of the class described, which is automatically operated in proper synchronism with the drawing and severing machine to accurately and efficiently separate the sections into different lots some of which are dependent on cross-sectional size and others on the weight of the sections.

The invention is fully described in the following specification, and while, in its broader aspect, it is capable of embodiment in numerous forms, a preferred embodiment thereof is illustrated in the accompanying drawings, in which,—

Figure 6:
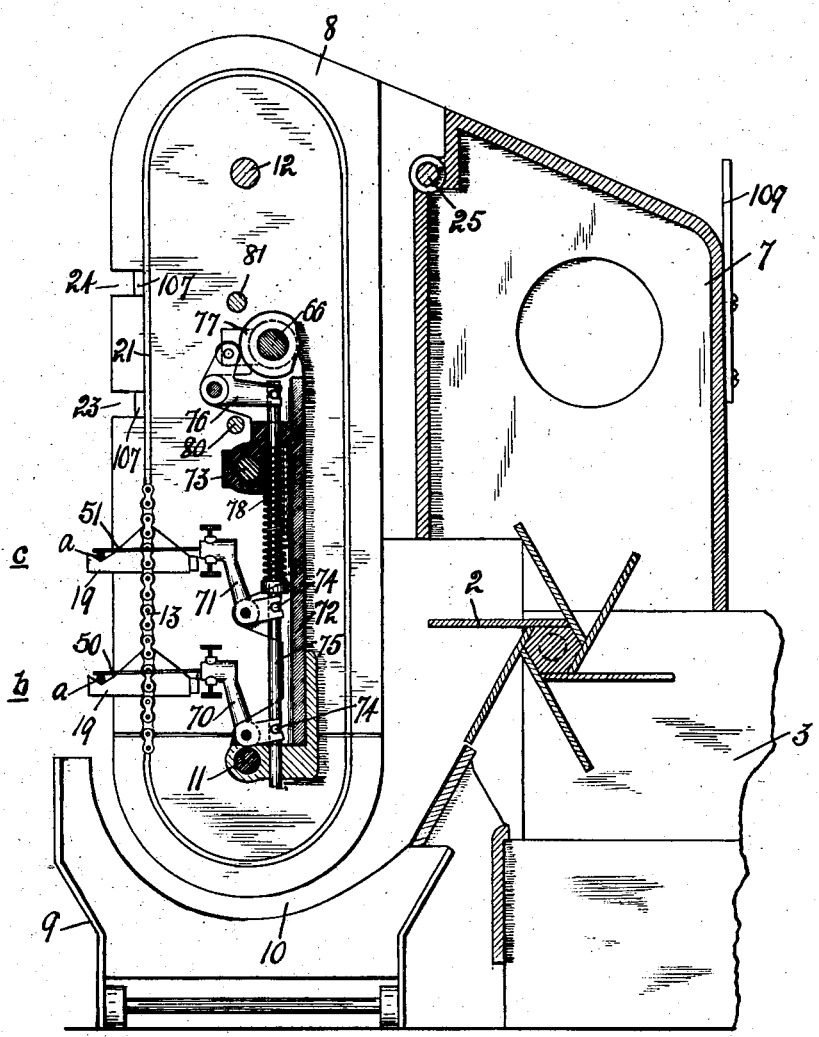

Figure 1 is an elevation of that side of a machine embodying the invention which is adjacent to the drawing and severing machine with which associated, with parts broken away and removed. Fig. 2 is a similar elevation with parts broken away and removed. Fig. 3 is a front elevation of the machine, with parts broken away and with one side portion in section on the line 3—3 in Fig. 1. Fig. 4 is an enlarged sectional detail taken on a part of the line 3—3 in Fig. 1. Fig. 5 is a vertical section on the line 5—5 in Fig. 3, with parts removed. Fig. 6 is a vertical section on the line 6—6 in Fig. 3, with portions removed. Figs. 7 and 8 are horizontal sections respectively on the lines 7—7 and 8—8 in Fig. 3, with parts broken away. Fig. 9 is an elevation similar to that of Fig. 1, with parts removed. Fig. 10 is a detail of the means controlling the dumping movements of the carrier arms when in weighing position. Fig. 11 is a sectional detail on the line 11—11 in Fig. 9. Fig. 12 is a similar section with the release slide in retracted position. Fig. 13 is a detail of a portion of the work gaging mechanism. Figs. 14 and 15 are enlarged details, respectively, of the under size and over size gaging portions of the gaging mechanism, with the gage slides partially advanced. Figs. 16 and 17 are elevations of the gage slide guides shown respectively in Figs. 14 and 15. Figs. 18 to 22 are different enlarged details of the weighing mechanism with the section of Fig. 21 taken on the line 21—21 in Fig. 19. Fig. 23 is an enlarged section on the line 23—23 in Fig. 19, with parts broken away. Fig. 24 is an enlarged perspective view of a carrier arm, and is a chart diagram of the operating relation of the different cams.

Referring to the drawings, 1 designates an end portion of the frame of the drawing and severing machine to which the assorting machine embodying the present invention is, in the present instance, connected, 2 the breaking off and delivery wheel (53) of said first machine, one end trunnion of which wheel is journaled in the frame 1 while the other end trunnion thereof is journaled in a bearing standard 3. The delivery wheel 2 comprises a plurality of longitudinally-extending blades which form successive pockets circumferentially of the wheel into which the work sections are fed by the drawing and severing machine, as is fully described in my said former Patent No. 1,220,201. The delivery wheel is geared to and caused to have intermittent turning movements imparted thereto, in synchronism with the running of the drawing and severing machine, so that the wheel is advanced one step for each severing operation of the machine, whereby a work section is fed into a registering pocket of the wheel and then delivered by gravity from the wheel to the assorting mechanism at the next or a predetermined succeeding movement of the wheel. 4 designates the drive shaft of the wheel driving mechanism, and carries a pinion 5, which is geared to the wheel through the medium of a set of gears of the Geneva type, the pin carrying member of which is mounted on a stub shaft 6. This driving means is adapted to impart a pocket advancing movement to the wheel 2 at each complete rotation of the shaft 4 and is similar to the delivery wheel driving mechanism disclosed in said former patent.

The frame 7 of the assorting machine is mounted at its rear portion on the frame 1 and standard 3 over the delivery wheel 2, and has its opposite sides 8—8 extending forward and vertically elongated, with their lower ends spaced from the floor or other subjacent member. A table or base member 9 is mounted below the forwardly extended portions of the frame sides in vertically spaced relation thereto and coöperates with the lower portions thereof to form segmental slots or passages 10 into which the work sections $a$ are deposited as they are discharged from the wheel 2, as is evident by reference to the drawings.

A pair of vertically spaced shafts 11 and 12 connect and are journaled at their ends in the respective sides 8 adjacent, respectively, to the upper and lower ends of said sides, and these shafts are connected adjacent to each side by a sprocket chain 13 operating around a set of sprocket wheels 14. The lower shaft 11 is preferably journaled at its ends in adjustment blocks 15, which form the lower end portions of the respective sides 8, 8 and are adjustably connected thereto by plates 16, which are rigidly secured at their upper ends to the lower end portions of the frame sides by screws or bolts 17 and are provided with vertical slots through which bolts or screws 18 pass to adjustably connect each bearing block to its plate (see Figs. 1, 2 and 3). Slack may be taken out of the chains 13 by loosening the bolts or screws 18 and then lowering the bearing blocks 15 and said screws with respect to the plates 16, after which the screws are tightened to retain the parts in adjustment.

The chains 13 may be termed "carrier chains" and each has a corresponding number of equally spaced carrier arms 19 pivotally carried thereby for vertical working movements. The pivots 20 of the carrier arms, which pivots are preferably formed by extending the ends of certain link connecting pivots of the chains toward the adjacent frame side (Fig. 3), are extended through the respective carrier arms adjacent to their lower edges (relative to upward moving carrier-arms) and intermediate their ends, and the outer ends of these pivots are projected beyond the respective carrier arms and travel in endless guide slots 21 in the frame sides, which slots are the same in form as the course of travel of the carrier chains. The carrier chains 13 are equidistantly spaced at their upper, lower and front side portions from the respective upper, lower and front edges of the respective frame sides, and the carrier arms 19 are of such length that their outer ends project beyond certain edges of the frame sides as they travel along the same, as shown in the drawings. The portion of the arms which project beyond the edges of the frame side are transversely notched on their forward sides, relative to the direction of movement of the arms, to adapt them to pick up work pieces from the subjacent passage 10 and carry them forward through said passage and upward at the front side of the frame. The carrier arms are arranged in pairs with the different arms of each pair attached to different chains and in horizontal alinement, thus adapting a pair of arms to coöperate in elevating a work piece. The forward sides of the carrier arms are broadened transversely of their pivots and each has a pin 22 projecting from its broadened portion into the guide slot 21 of the adjacent frame side to serve to normally retain the arm in right angled relation to the line of movement of the portion of the chain 13 to which connected. The front edge of each frame side is provided, in the present instance at two points therein, with notches 23 and 24, which extend rearward to the guide groove 21 so that the front wall of such groove is open at such point, thus permitting downward tilting of the work supporting end of each carrier arm as its pin 22 moves into register with either of said notches, and a consequent delivery or dumping from the arm of the work piece supported thereby. This dumping action of the carrier arms is controlled by a weighing mechanism which will be hereinafter described. Guards 13' inclose the carrier chains.

A shaft 25 is journaled at its ends in the frame sides 8, 8 at the rear of the shaft 12 and has a chain and sprocket wheel connection 26 with a stub shaft 27, mounted in the inner end of the frame 7 above the drive shaft 4 and provided with a gear 28 in mesh with the gear 5 on said drive shaft. The shaft 25 is in driving connection with the shaft 12 through a train of gears 29 having a set of Geneva gears interposed therein, which gears are disposed at the outer side of the inner frame side 8. (See Fig. 9). It is thus evident that the shaft 25 is continuously driven from the drive shaft 4 and that step-by-step rotation is imparted to the shaft 12 from the shaft 25 by the action of the Geneva gear connection. The gearing is so proportioned that the carrier chains 13 are moved a distance equal to the distance between the pivots of adjacent carrier arms at each complete rotation of the shaft 4 so that each work piece, as it is delivered to the base by the delivery wheel 2, is engaged and advanced a step by a pair of carrier arms before the next work piece is delivered into position to be picked up by a pair of carrier arms.

The assorting machine illustrated is adapted to perform four functions as work pieces are elevated by the carrier arms at the front side of the frame, namely, first, the gaging of work pieces to determine and deliver "over sizes" from the machine; secondly, the gaging of work pieces to determine and deliver "under sizes" from the machine; thirdly, the weighing of work pieces to determine and deliver heavy work pieces from the machine; and, fourthly, the weighing of work pieces to determine and deliver perfect or O. K. work pieces from the machines. These several operations take place respectively at the rest positions $b$, $c$, $d$ and $e$ of the carrier arms.

Work gaging mechanism.

The over size gaging means comprises two gaging slides 30 one of which is mounted at the outer side of each frame side 8 for backward and forward movements and has its inner side bearing against a guide plate 31, which is stationarily set in a recess 32 in the respective frame side (Figs. 4, 15 and 17). The guide slides 30 are disposed at the outer sides of a pair of arms 19 when in the position $b$ of their movements, and each has its outer or forward end provided longitudinally thereof with a gage notch 33, the mouth of which is preferably slightly restricted relative to the inner end portion thereof, and of suitable size to pass over or receive all work pieces over a predetermined cross-sectional size. The upper wall of the notch 33 is projected forward beyond the end of the lower wall thereof to form a nose 34, which, upon a forward movement of the gage slide, is adapted to rest on the top of a work piece carried by a registering set of arms 19 and to guide the mouth of the notch 33 to work-receiving position.

The guide plate 31 is provided with a guide slot 35, which extends from its forward end to near its rear end and in which travels a pair of guide pins 36 and 37, which project from the slide 30 in spaced relation longitudinally thereof. The rear end portion of the guide slot 35 is reduced in vertical width to substantially the vertical width of the pin 37, which is disposed at the rear end of the slide 30 and the forward end portion of said slot, is broadened both upward and downward from the longitudinal center of the slot to permit a vertical movement of the pin 36 therein. Inclines 38 and 39 connect the forward and rear end portions of the respective lower and upper walls of the slot 35, with the incline 38 of the lower wall disposed slightly forward of the upper incline 39. When the slide 34 is in its rearward or retracted position, both pins 36 and 37 are disposed in the rear narrow portion of the slot 35, thus preventing vertical rocking of the slide. The pin 36 and the incline 39 are so relatively positioned that they will register with each other when the slide has advanced a sufficient distance approximately for its nose 34 to engage a registering work piece, and the pin will then be free to move upward in the broadened portion of the slot should the size of the work piece be such as to cause an upward tilting of the slide as its nose passes over the same. Should the work piece be of too great a size to pass through the mouth of the gage notch 33 it will be forced outward from the supporting arms 19 and on to guides 40 by which it is delivered to desired position. The upward movement of the work piece over the inclined ends of the carrier arms causes a corresponding upward tilting of the outer gage slide end, and this movement is prevented until the pin 36 has moved into register with the incline 39 to travel up the same, the upward broadening of the outer end portion of the guide slot then permitting said movement. The purpose of downwardly broadening the other end portion of the guide slot is to permit the outer end portion of the gage slide to drop after a work piece, which is being ejected, has passed beyond the end of the supporting carrier arm so that upon the retracting movement of the gage slide the work will be positively stripped from the slide by coaction with the carrier arm end. The length of the notch 33 is such that the slide may have a complete forward stroke without moving the rear wall of the slot into displacing engagement with a work piece entering the same.

The "under size" gage slide 41 is similar in its action to the "over size" gage slide 30 except that should the work piece be under size it will pass into the gage notch 42 and then be ejected by the rear wall thereof from the supporting carrier arms. The gage notch 42 is therefore of less horizontal depth than the notch 33 of the over size gage so that the rear wall of the former will move into contact with an under size work piece and force it outward from the carrier arm before the slide has completed its forward stroke. The ejected work piece falls into guides 43 by which it is delivered to suitable position.

The guide plate 44 for the gage slide 41 is provided with a guide slot 45 in which pins 46 and 47 that project from the gage slide, travel. This slot is both upwardly and downwardly broadened at its forward end, as shown, for the same reason as the broadening of the guide slot 35 in the guide 31, and is provided with the upper and lower inclines 48 and 49, respectively. The upper incline 48 is so disposed with relation to the pin 46 that such pin will not be permitted to enter the upwardly broadened portion of the slot, and thus permit an upward tilting of the gage slide, until the slide has advanced sufficiently for the registering work piece, if an "under size", to enter the gage notch in the slide. It is thus evident that should the slide encounter a proper size work piece the outward movement thereof, which is of a yielding nature, will be arrested as the outer slide end is not permitted to rise to force the work piece upward and outward over the incline of the carrier arm. However, should the work piece be under size the pin 46 will move into register with the upper incline 48 by the time the rear end of the gage notch 42 moves into contact with the work piece, thus permitting an upward tilting movement of the work piece to enable the slide to complete its outward stroke to eject the work piece outward from the associated carrier arm.

When work pieces are in the positions $b$ and $c$ they are held to the respective carrier arms by pressure fingers 50 and 51, respectively (Figs. 6 and 8). These fingers are automatically operated, by mechanism hereinafter described, to release the work pieces in time to be ejected by the respective gage slides 30 and 41, or at predetermined points in each cycle of operations of the machine.

A gage slide operating cross-head 52 is mounted at the outer side of each frame side 8 for forward and rearward movements and is provided at each its upper and its lower end with a horizontal slot 53, the lower of which receives the pin 37 in the gage slide 30, while the upper receives the pin 47 of the gage slide 41, thus permitting the crosshead and slides to have predetermined relative reciprocatory movements. The crosshead 52 is carried by a slide bar 52' that is mounted for horizontal sliding movements in the frame side between the gage slides 30 and 41. The outer ends of the pins 37 and 47, which project outward beyond the cross-head 52, have rods 54 and 55, respectively, projecting therefrom through guides 56 (Figs. 1, 2 and 8), and each rod is outwardly angled at its rear end and attached to the rear ends of respective coiled contractile springs 57 and 58. These springs extend forward from the rear ends of said rods and are stationarily anchored at their forward ends to pins 59 projecting from a guide plate 60 (Figs. 8 and 9) that is secured to the forward edge portion of the respective frame side and at the outer sides of the slides 30 and 41 to coöperate with the frame to guide the movements thereof.

The springs 57 and 58 continually urge the connected gage slides to have forward movements and normally maintain the pins 37 and 47 at the forward ends of the respective slots in the cross-head 52 so that when said cross-head is moved forward the gage slides move forward therewith under the influence of the springs. Should either gage slide, before it has completed its forward stroke, be stopped by a work piece, as hereinbefore described, the slides will remain at rest during the remainder of the forward stroke of the cross-head or until the period at which the work pieces are released for ejection by the holding fingers 50 and 51. Upon a rearward stroke of the cross-head 52, the gage slides are positively retracted therewith against the tension of said springs by the coaction of the forward end walls of the slots 53 with the respective pins 37 and 47.

An operating lever 61 for each cross-head 52 is fulcrumed at 62 to the respective side of the frame, and has its lower end connected to the associated cross-head by a link 63 and its upper end provided with a roller 64 in contact with the periphery of a cam 65. This cam is fixed to the adjacent end of a shaft 66, which is journaled in the frame sides with its ends projecting without the same. A rod 67 projects rearward from the lower arm of the lever 61 through a guide 68 on the frame and is encircled by a coiled compression spring 69, which acts to exert a forward movement on the lower arm of the lever, thus maintaining the roller 64 in contact with its operating cam. The work holding fingers 50 and 51 are removably attached to and project forward from the upwardly-extending arms of respective bell crank levers 70, 71, which are fulcrumed for vertical rocking movements and in superposed relation to a bracket 72 (Fig. 6). This bracket is fixedly carried near its upper end by a stationary shaft 73, connecting the sides of the frame, and has its lower end provided with a bearing for receiving the lower carrier chain shaft 11. The other arm of each lever 70, 71 extends rearward and is forked over a respective pin 74 on a vertical rod 75, which rod is mounted for vertical reciprocatory movements in the bracket 72. A bell crank lever 76, which is fulcrumed to the upper end portion of the bracket 72, has one bar connected to the upper end of the rod 75 and its other end provided with a roller in contact with the periphery of an operating cam 77 fixed to the cam shaft 56. The roller is normally held against the cam by the action of a spring 78 on the rod 75. The cam 77 causes the fingers 50 and 51 to remain in holding contact with the respective work pieces of the carrying arms in the gaging positions $b$ and $c$ until the gage slides 30 and 41 have moved forward a predetermined extent, as hereinbefore described, and then permits a raising of the fingers, under the action of the spring 78, from work holding position preparatory to an ejection of the same by the gage slides, should the work pieces be over or under sized, as the case may be. The fingers then remain in raised or released position until the carrier chain has been advanced one step to bring other work pieces into holding position.

The cam shaft 66 is driven from the shaft 25 at the same speed therewith through its sprocket-wheel and chain connection 79 (Figs. 3, 5 and 7), so that the cam shaft has one revolution for each work advancing movement of the carrier chain. A bearing and bracing arm 79' connects the shafts 25 and 66.

*Weighing mechanism.*

A pair of superposed weight shafts 80 and 81 are disposed horizontally between the frame sides and have knife edge bearings at their ends in bearing plates 80' and 81', respectively, secured to the inner sides of the respective frame sides. The shaft 80 is positioned at the rear of a pair of carrying arms 19 in the weighing position $d$, and the shaft 10 is positioned at the rear of a pair of carrying arms in the weighing position $e$ (Figs. 3, 7, 8 and 18 to 22, inclusive). Each of these shafts has a trip-lever 82 fulcrumed thereto for rocking movements relative to the shafts longitudinally thereof. The forward end of each lever is provided with a transversely projecting pin 83, which, when the lever is in normal position relative to its shaft, projects outward over a tail-piece 84 on the rear end of the associated carrier arm so that a work discharging rocking movement of the carrier arm will impart a reverse rocking movement to the coacting lever 82 and shaft carrying the same. Each lever 82 is normally retained in the arm engaging position shown in Fig. 21 by a coiled contractile spring 85, which connects the rear end of the arm to a pin 86 projecting transversely from the shaft carrying the lever. The spring influenced movement of each lever 82 is limited by a stop 87 (Fig. 21), which is connected to one side of the associated shaft.

The tail-piece 84 of each carrier arm, when rocked upward, passes by the coacting lever pin 83, and in order for the tail-piece on its return movement, to pass by the pin, it, the tail-piece, is tapered as shown in Figs. 23 and 24, thus enabling it to have snap movement past the pin.

In order to prevent the carrier arms from rocking the weight shafts when the carrier is advanced, each lever 82, 82, just prior to each advance of the carrier, is rocked to withdraw its pin from the path of the carrier arm and is permitted to return before the next weighing operation. This is accomplished by a cam 88 on the cam shaft 66 acting at its side against one end of a rod 89 which is guided for reciprocatory movements in parallel relation to the shaft axis by a bracket arm 90 projecting from the adjacent frame side 8 intermediate the shafts 80 and 81. A vertically-disposed cross-arm 91 is carried by the other end of the rod 89 and has its ends provided with transversely projecting pins in thrust contact with the inner sides of the rear end portions of the levers 82 so that a cam actuated movement of the rod 89 will rock said levers to withdraw the pins 83 from vertical register with the carrier arms. A spring 92 coöperates with the trip rod and bracket 90 to yieldingly retain the rod in engagement with the cam face.

Each shaft 80, 81 has a horizontally-disposed weight lever 93 fixed thereto for rocking movements therewith and one arm of each lever is provided with an upstanding pin 94 over which one or more weights 95 may be positioned, and the other arm of this lever has one or more counter-balance weights 96 threaded thereon for movements toward and away from the shaft, whereby a fine adjustment of the weighing mechanism may be effected. The heavy end of each weight lever is adapted to have stop contact with a respective stop-screw 97 that is threaded through a portion of the bracket 72. It is evident that a tilting of the carrier arms, in the positions $d$ and $e$, to deliver work pieces therefrom, is controlled and resisted by the weights 95 on the respective weight shaft and that should a work piece in the position $d$ be an overweight it will over-balance the weights 95 on the shaft 80 and effect a rocking of the shaft sufficient to permit the tail-piece 84 to pass upward by the associated pin 83. In the same manner should the work piece, which is carried by the arms in the position $e$, be an "O. K." or of correct weight, it will cause an over-balancing of the weight 95 on the shaft 81 and a consequent tilting of the carrier arm to dump the work piece therefrom. When the tail-piece 84 has passed upward by a pin 83 the associated weight shaft will return to its normal position by gravity. The return of each carrier-arm to its work carrying position is positive, as hereinafter described.

Each carrier arm 19, as hereinbefore described, has a pin 22 projecting therefrom above its fulcrum and traveling in the guideway 21 in the adjacent frame side so that a carrier arm is only permitted to have a tilting or work discharging movement when at either weighing positions $d$ or $e$. In each of these positions the pins 22 may move forward from the guide groove 21 into the respective registering frame notches 23 and 24, which open at their rear ends into the groove (Figs. 1, 2, 3 and 9) unless prevented by a control means which will now be described.

A slide bar 100 is mounted for forward and backward movements at the outer side of each frame side and has a longitudinally-extending slot 101 through which the shaft 66 projects. The slide bar at the rear of the shaft carries a roller 102 which coacts with a cam 103 on the adjacent end of the shaft 66 to control the reciprocatory movements of the slide. A spring 104, which encircles a rod 105, acts on the rear end of the slide bar to urge a forward movement thereof and to normally retain the roller in contact with its cam. The slide bar at its forward end is provided with a cross-arm 106, which has lugs 107 projecting inward from its ends and into the frame notches 23 and 24, one lug being provided for each notch. When the slide bar is at the rear end of its stroke, the lugs 107 are flush with the front wall of the associated groove 21 and coact with the carrier arm pins 22 to prevent a tilting of said arms. When the lugs are moved forward in the notches 23 and 24 by a forward movement of the slide bar 100 they uncover the inner portions of the respective notches to the groove sufficient to permit a work-discharging tilting movement of the arms, as shown in dotted lines in Figs. 1, 9, 11 and 12. The forward movements of the slide bars 100 are timed to take place when two pair of carrier arms have moved to the respective "heavy" and "O. K." positions, and the rearward movements of said bars, which movements are positively effected by the action of the cam, are timed to take place before the next advancing movement of the carrier so that the carrier arms, after being tilted, will be positively returned to normal position before the next movement of the carrier.

It will be understood that, in the present instance, the weighing shafts 80 and 81 extend entirely across the machine so that they are common to both carriers, and that the weighing mechanisms which control the tilting of the carrier arms, are alike for each carrier. However, only one stop adjustment for the rocking movements of each weighing shaft is provided.

In the use of my machine the work sections are successively fed or dropped by the delivery wheel into the gravity space 10 between the carrier chain and base 9 and held by spring fingers 108 until picked up and advanced by a pair of carrier arms during an advancing movement thereof. The length of each intermittent movement of the carrier chain and the spacing of the carrier arms thereon is such that each work piece will be picked up and carried forward with a pair of arms before a succeeding work piece has been dropped into picking-up position. When a work piece has been advanced by a pair of carrier arms to the "oversize" gaging position $b$ the gage slides 30 are moved forward, and should the work piece be of too great diameter or cross-sectional size to enter the gage notch 33, the movement of the slides will be partially arrested due to the abutting of the lower front edge portion thereagainst, such arresting being permitted by the spring 57 which urges the forward movement of the slide. At approximately this point in the movement of the slide, the work holding finger 50 is raised to permit a forcing of the work piece up over the raised ends of the carriers by the slide and delivered to the guides 40 provided for oversized work. Should the work be of proper size or undersize, the gage notch 33 of the slide will pass over the same so that the slides will be permitted to complete their strokes without ejecting the work piece from the carrier arms. At the next cycle of movements the work piece, if not ejected from the carrier arms as an over-size, will be carried upward to the under size gaging position $c$, in which position it is acted on by the gage slides 41. When these slides advance, the work piece, if undersized, will enter the shallow notches 42 thereof and be ejected from the carrier arms during the continued forward stroke of the slides after the work holding fingers 51 have been raised from holding position. If the work piece is too large to enter the gage notches 42, and therefore of proper size, the walls of the notches at the mouth ends will abut against the work piece and arrest the forward movement of the slides, such arresting taking place before the pins 46 have reached the upper wall inclines 48 of the guide slot 45, so that the gage slides in such arrested positions, will not be permitted to rock upward and force the work over the outer inclined ends of the carrier arms. Both gage slides 30 and 41 at each side of the machine are released at the same time to move forward under the action of the springs 57 and 58 by the forward movement of the respective cam-controlled cross-head 52, and are positively returned to retracted position by the rearward stroke of said cross-head. If the work piece carried by the arms is of proper size, it advances to the weighing position $d$ at the next movement of the carrier, and is there tested for over-weight. If it is too heavy the weight 95 on the weighing-shaft 80 will be overbalanced, permitting a downward tilting of the carrying arms to discharge the work piece, the levers 82 and shaft 80 being rocked out of normal position by such movement. At this period in the operation, the slide 100 stands at the forward end of its stroke with the lugs 107 advanced from the respective guide grooves 21 to release the carrier arm pins 22 for forward tilting movements. As soon as the carrier arms have been released of their load they are positively returned by the inward movement of the lugs 107 and snap past the trip pins 83. After the return of the carrier arms and before the next advancing movement of the carriers the levers 82 are rocked to withdraw the pins 83 from over the carrier-arm and are then released after the carrier-arms have passed, thus preventing a second tripping of the levers 82 and rocking of the weighing shaft by the next advancing movement of the carrier. If the work piece is "O. K." in size and weight, it will be delivered from the carrier arms when they moved to the position e by reason of the weights 95 on the weighing shaft 81 being overbalanced, the action being the same as described for the over-weight mechanism. However, should the work be under the proper weight it will be carried up to the top of the machine frame and permitted to roll rearward down the same, due to the incline of the top, to a stop 109. The work discharged from the carrying arms at the positions d and e drop onto receiving guides 110 and 111, respectively.

It is found in practice that the work pieces are sometimes either over-size or under-size, or of greater or less weight at one end only, so that one end may be discharged from the carrier arm of one carrier and not from the other. In order to prevent the work piece from hanging onto the carrier arm from which it was not discharged, I have provided each side of the machine adjacent to its forward edge with an outwardly projecting deflector plate 112 so that when one end of a work piece is swung outward by the discharging movement, the other end will engage the adjacent deflector plate and cause a swinging of the work piece from the engaged carrier arm, or, in other words, prevent the work piece from turning on the engaged carrier arm as a fulcrum. It is evident that with my machine the sizing and weighing of work pieces may be accurately carried on and those of different sizes and weight delivered to different positions, the operation of the machine being carried on automatically.

The relative periods of operation of the different cams 65, 77, 88 and 103 and the movements of the carrier for each cycle of operations is diagrammatically illustrated in Fig. 25 in which the arc 113 indicates the period of travel of the carrier and the other arcs indicate the different movements and their relative periods of action. Starting a cycle of operations immediately after an advancing movement of the carrier it will be noted that the right hand gage cam 65 begins to act, to move the respective gage slides 30 and 41 forward, at approximately 22 degrees before the completion of a cycle and continues its action for approximately 172 degrees, while the left hand gage cam 65 preferably does not commence its action until approximately 100 degrees after the commencement of the action by the right hand gage cam, and continues its action for approximately 170 degrees. The action of the dumping cams 103 to advance and control the retraction of the slides 100 begins approximately 15 degrees past the zero point of a cycle and continues for approximately 195 degrees. The trip arm cam 88 begins its action at approximately 215 degrees and completes its action at approximately 305 degrees of a cycle, and the tube finger cam 77 begins its action at approximately 240 degrees and finishes at the end of the cycle. The carrier movement continues for approximately 120 degrees commencing at approximately 240 degrees and finishing with the cycle. In reading the cam diagram it should be considered as being stationary with an imaginary arm, carrying cam engaging rollers, swinging about the same in concentric relation thereof.

I wish it understood that my invention is not restricted to any specific construction, arrangement or form of the parts or to the use of all of the combination of elements disclosed therein, as it may be varied or modified in numerous respects.

Having thus described my invention, what I claim as new, and desire to secure by Letters Patent, is,—

1. In an assorting machine of the class described, an article carrier, means for moving said carrier, and means automatically movable to gage the size of an article carried by said carrier when the carrier is at a predetermined point in its movement, and, if the article is above a predetermined size, to eject it from the carrier.

2. In an assorting machine of the class described, an article carrier, means for moving said carrier, and means automatically movable to gage the size of an article carried by said carrier when the carrier is at a predetermined point in its movement, and, if the article is below a predetermined size, to eject it from the carrier.

3. In an assorting machine of the class described, an article carrier, means for moving said carrier, and means automatically operable to gage the size of an article carried by said carrier when the carrier is at a predetermined point in its movement, and, if the article is above a predetermined size, to eject it from the carrier, said gage means having a slide member provided with a gage notch for receiving the article and operating to prevent its ejection if not oversized.

4. In an assorting machine of the class described, an article carrier, means for moving said carrier, and means automatically operable to gage the size of an article carried by said carrier when the carrier is at a predetermined point in its movement, said gage means having a slide member provided with a gage notch for receiving the article and operating to eject the article, if undersize, from the carrier.

5. In a machine of the class described, a work carrier, means for moving said carrier to advance the work, a gage member movable to engage work at a predetermined point in its movement with the carrier, and to eject the work, if oversized, from the carrier, means for yieldingly imparting gaging and ejecting strokes to said member, and means operable to periodically retract said member and to control its reverse movements.

6. In a machine of the class described, a work carrier, means for moving said carrier to advance the work, a gage member movable to engage work at a predetermined point in its movement with the carrier, and to eject the work, if undersized, from the carrier, means for yieldingly imparting gaging and ejecting strokes to said member, and means operable to periodically retract said member and to control its reverse movements.

7. In a machine of the class described, a work carrier, means for moving said carrier to advance the work, a gage slide, means for yieldingly moving said slide to gage the size of a work piece when at a predetermined point in its movement with the carrier and to eject the work piece, if over-sized, from the carrier, means automatically operable to permit periodical gaging and ejecting movements of said slide and then to retract it, and means guiding the movement of the slide to cause it to move in one plane when gaging a work piece and to permit it, in addition, to move in an intersecting plane in ejecting a work piece.

8. In a machine of the class described, a work carrier, means for moving said carrier to advance the work, a gage slide, means for yieldingly moving said slide to gage the size of a work piece when at a predetermined point in its movement with the carrier and to eject the work piece, if undersized, from the carrier, means automatically operable to permit periodical gaging and ejecting movements of said slide and then to retract it, and means guiding the movement of the slide to cause it to move in one plane when gaging a work piece and to permit it, in addition, to move in an intersecting plane in ejecting a work piece.

9. In a machine of the class described, a carrier adapted to advance a work piece carried thereby, a gage member movable to gage a work piece carried by said carrier when at a predetermined point in its movement with the carrier and, if the work piece is oversized, to then eject it from the carrier, means guiding the movement of said member, means yieldingly urging a work gaging and ejecting movement of said member, and means periodically operable to permit said member to have gaging and ejecting movements and then to retract the member.

10. In a machine of the class described, a carrier adapted to advance a work piece carried thereby, a gage member movable to gage a work piece carried by said carrier when at a predetermined point in its movement with the carrier and if the work piece is undersized, to then eject it from the carrier, means guiding the movement of said member, means yieldingly urging a work gaging and ejecting movement of said member, and means periodically operable to permit said member to have gaging and ejecting movements and then to retract the member.

11. In a machine of the class described, a work carrier, means for imparting advancing movements to said carrier, means for operating on a work piece when at a predetermined point in its movement with the carrier to gage its size and if oversized to eject it from the carrier, and means automatically operable to engage and hold the work piece to the carrier during a predetermined portion of the work gaging and ejecting movements of said gaging and ejecting means and then to release the work.

12. In a machine of the class described, a work carrier, means for imparting advancing movements to said carrier, means for operating on a work piece when at a predetermined point of its movement with the carrier to gage its size and, if undersized, to eject it from the carrier, and means automatically operable to engage and hold the work piece to the carrier during a predetermined portion of the work gaging and ejecting movements of said gaging and ejecting means and then to release the work.

13. In a machine of the class described, an endless carrier having vertical work carrying movements, and means automatically movable when the work piece carried by the carrier is at a predetermined point in its vertical movement therewith to gage the size of the work piece and, if the work is oversized, to eject it from the carrier.

14. In a machine of the class described, an endless carrier having vertical work carrying movements, and means automatically movable when the work piece carried by the carrier is at a predetermined point in its vertical movement therewith to gage the size of the work piece and, if the work is undersized, to eject it from the carrier.

15. In a machine of the class described, an endless work carrier mounted for vertical movements, means for imparting step-by-step movements to said carrier, a reciprocally movable work gaging member operable to act on a work piece carried by the carrier at a predetermined point in a movement of the carrier and when it is at rest to gage the size of the work piece and, if oversized, to eject it from the carrier during one stroke of the gage member, and means controlling the movements of said gage member and operable to impart periodical yielding gaging and ejecting strokes and positive retracting strokes thereto.

16. In a machine of the class described, an endless work carrier mounted for vertical movements, means for imparting step-by-step movements to said carrier, a reciprocally movable work gaging member operable to act on a work piece carried by the carrier at a predetermined point in a movement of the carrier and when it is at rest to gage the size of the work piece and, if under-sized, to eject it from the carrier during one stroke of the gage member, and means controlling the movements of said gage member and operable to impart periodical yielding gaging and ejecting strokes and positive retracting strokes thereto.

17. In a machine of the class described, an endless work carrier mounted for vertical work carrying movements, means for imparting step-by-step advancing movements to said carrier, means having a reciprocally movable gage member periodically operable to yieldingly move in one direction to gage a work piece carried by said carrier and when at a predetermined point in its movement therewith, and, if the work piece is oversized, to eject it from the carrier and then to return to retracted position, and means automatically operable to engage and hold the work piece to the carrier during a predetermined portion of the work gaging and ejecting movements of said gaging member.

18. In a machine of the class described, an endless work carrier mounted for vertical work carrying movements, means for imparting step-by-step advancing movements to said carrier, means having a reciprocally movable gage member periodically operable to yieldingly move in one direction to gage a work piece carried by said carrier and, when at a predetermined point in its movement therewith, and if the work piece is undersized, to eject it from the carrier and then to return to retracted position, and means automatically operable to engage and hold the work piece to the carrier during a predetermined portion of the work gaging and ejecting movements of said gaging member.

19. In a machine of the class described, an endless work carrier mounted for vertical work carrying movements, means for imparting step-by-step advancing movements to said carrier, means for operating on a workpiece when at a predetermined point in its movement with the carrier to gage its size, and, if oversized, to eject it from the carrier, and means automatically operable to engage and hold the work piece to the carrier during a predetermined portion of the work gaging and ejecting movements of said gaging and ejecting means and then to release the work to permit its ejection.

20. In a machine of the class described, an endless work carrier mounted for vertical work carrying movements, means for imparting step-by-step advancing movements to said carrier, means for operating on a work piece when at a predetermined point in its movement with the carrier to gage its size, and, if undersized, to eject it from the carrier, and means automatically operable to engage and hold the work piece to the carrier during a predetermined portion of the work gaging and ejecting movements of said gaging and ejecting means and then to release the work to permit its ejection.

21. In a machine of the class described, a work carrier, means for moving said carrier to advance a work piece therewith, means having a work gaging and ejecting member periodically movable to yieldingly act on a work piece at a predetermined point in its movement with the carrier to gage the work piece and, if oversized, to eject it from the carrier and then to return to retracted position, the gage member in its returning movement operating with the carrier to strip the ejected work piece from the member.

22. In a machine of the class described, a work carrier, means for moving said carrier to advance a work piece therewith, means having a work gaging and ejecting member periodically movable to yieldingly act on a work piece at a predetermined point in its movement with the carrier to gage the work piece, and, if undersized, to eject it from the carrier and then to return to retracted position, the gage member in its returning movement coöperating with the carrier to strip the ejected work piece from the member.

23. In a machine of the class described, a work carrier, means for imparting work advancing movements to said carrier, means automatically operable to gage the size of a work piece carried by said carrier when the carrier is at a predetermined point in its movement and if the work piece is above a predetermined size to eject it from the carrier, said gage means having a slide member provided with a gage notch for receiving the work piece and operating to prevent its ejection if not oversized, and guide means for said slide member for causing it to stand in one plane during a portion of its movement and then permitting it to assume an inclined position relative to such plane.

24. In a machine of the class described, a work carrier for imparting work advancing movements to said carrier, means automatically operable to gage the size of a work piece carried by said carrier when the carrier is at a predetermined point in its movement and if the work piece is under a predetermined size to eject it from the carrier, said gage means having a slide member provided with a gage notch for receiving and operating to eject the work, if undersized, from the carrier, and guide means for said slide member for causing it to stand in one plane during a portion of its movement and then permitting it to assume an inclined position relative to such plane to coöperate on its return stroke with the carrier to strip the ejected work piece from the slide member.

25. In a machine of the class described, a work carrier having carrier arms with recessed work holding portions, means for imparting work advancing movements to said carrier, means automatically operable to gage the size of a work piece carried by said carrier when the carrier is at a predetermined point in its movement, and if the work piece is above a predetermined size, to eject it from the carrier, and means for guiding the movement of the work coacting portion of said ejecting means to cause it to stand in one plane during a portion of its movement and then permitting it to assume inclined position relative to such plane to eject the work piece from the recessed portion of the carrier.

26. In a machine of the class described, a work carrier having carrier arms with recessed work holding portions, means for imparting work advancing movements to said carrier, means automatically operable to gage the size of a work piece carried by said carrier when the carrier is at a predetermined point in its movement, and if the work piece is below a predetermined size, to eject it from the carrier, and means for guiding the movement of the work coacting portion of said ejecting means to cause it to stand in one plane during a portion of its movement and then permitting it to assume an inclined position relative to such plane to eject the work piece from the recessed portion of the carrier.

27. In a machine of the class described, a work carrier having work carrying members which are recessed on their top sides to form work seats, a gage slide movable to coact with a work piece when at a predetermined point in its movement with the carrier to gage the size of the same, and, if oversized, to eject it from the carrier, said slide having guide pins projecting therefrom, means controlling the movements of said slide and operable to impart periodical yielding work gaging and ejecting movements and positive retracting movements thereto, and a stationary member having a guide way in which said guide pins work and coöperating therewith to cause it to stand in one plane during its work gaging movements permitting it to assume an inclined position relative to such plane during its ejecting movements.

28. In a machine of the class described, a work carrier having work carrying members which are recessed on their top sides to form work seats, a gage slide movable to coact with a work piece when at a predetermined point in its movement with the carrier to gage the size of the same and, if undersized, to eject it from the carrier, said slide having guide pins projecting therefrom, means controlling the movements of said slide and operable to impart periodical yielding work gaging and ejecting movements and positive retracting movements thereto, and a stationary member having a guide way in which said guide pins work and coöperating therewith to cause it to stand in one plane during its work gaging movements and permitting it to assume an inclined position relative to such plane during its ejecting movements.

29. In a machine of the class described, a work carrier having work carrying members which are recessed on their top sides to form work seats, a gage slide movable to coact with a work piece when at a predetermined point in its movement with the carrier to gage the size of the same and, if oversized, to eject it from the carrier, said slide having guide pins projecting therefrom, means controlling the movements of said slide and operable to impart periodical yielding work gaging and ejecting movements and positive retracting movements thereto, and a stationary member having a guide way in which said guide pins work and coöperating therewith to permit a raising movement of the gage slide with the work as it is ejected from the holding recess of the carrier member and to permit it to lower when the work piece has passed beyond the carrier member, whereby the outer end of the carrier member coacts with and strips the work piece from the gage slide upon a retracting movement of said slide.

30. In a machine of the class described, a work carrier having work carrying members which are recessed on their top sides to form work seats, a gage slide movable to coact with a work piece when at a predetermined point in its movement with the carrier to gage the size of the same, and if undersized, to eject it from the carrier, said slide having guide pins projecting therefrom, means controlling the movements of said slide and operable to impart periodical yielding work gaging and ejecting movements and positive retracting movements thereto, and a stationary member having a guide way in which said guide pins work and coöperating therewith to permit a raising movement of the gage slide with the work as it is ejected from the holding recess of the carrier member and to permit it to lower when the work piece has passed beyond the carrier member whereby the outer end of the carrier member coacts with and strips the work piece from the gage slide upon a retracting movement of said slide.

31. In a machine of the class described, a work carrier, means for imparting work advancing movements to said carrier, a reciprocally movable gage member operable during one stroke thereof to gage a work piece carried by said carrier and, if the work piece is undersized, to eject it from the carrier, and means automatically operable to control the movement of said gage member and to impart yielding work gaging and ejecting strokes and positive retracting strokes thereto, the gaging and ejecting strokes of said member being stopped by its engagement with an oversized work piece.

32. In a machine of the class described, a work carrier adapted to simultaneously carry a plurality of work pieces in separated relation, means for moving said carrier to advance the work pieces, and mechanism having separate gage members and operable to move said members to gage different work pieces carried by the carrier, one gage member being operable to eject a gaged work piece, if oversized, from the carrier and the other member being operable to eject a gaged work piece, if undersized, from the carrier.

33. In a machine of the class described, a work carrier adapted to simultaneously carry a plurality of work pieces in separated relation, means for imparting work advancing movements to said carrier, a plurality of work gaging members, and means for controlling the movements of said members and operable to impart yielding work gaging strokes thereto, one of said members being operable to eject a gaged work piece, if oversized, from the carrier and another of said members being operable to eject a gaged work piece, if undersized, from the carrier.

34. In a machine of the class described, a work carrier adapted to simultaneously carry a plurality of work pieces in separated relation, means for moving said carrier to advance the work pieces, mechanism having separate gage members and operable to move said members to gage different work pieces carried by the carrier, one gage member being operable to eject a gaged work piece, if oversized, from the carrier, and the other member being operable to eject a gaged work piece, if undersized, from the carrier, and means automatically operable to engage and hold the work pieces to the carrier during a predetermined portion of the work gaging and ejecting movements of the gaging members.

35. In a machine of the class described, a work carrier adapted to simultaneously carry a plurality of work pieces in separated relation, means for imparting work advancing movements to said carrier, a plurality of work gaging members, means for controlling the movements of said members and operable to impart yielding work gaging strokes thereto, one of said members being operable to eject a gaged work piece, if oversized, from the carrier and another of said members being operable to eject a gaged work piece, if undersized, from the carrier, and means automatically operable to engage and hold the work pieces to the carrier during a predetermined portion of the work gaging and ejecting movements of the gaging members.

36. In a machine of the class described, a carrier adapted to simultaneously carry a plurality of work pieces in separated relation, means for imparting step-by-step advancing movements to said carrier, means automatically operable to engage the work pieces and hold them to the carrier during portions of the at-rest periods thereof and to release the work pieces prior to an advancing movement of the carrier and to remain released during such advancng movements, and mechanism automatically operable to simultaneously gage the separate work pieces on the carrier during a rest period thereof and to eject one work piece, if oversized, and another work piece, if undersized, from the carrier.

37. In a machine of the class described, a work carrier adapted to simultaneously carry a plurality of work pieces in separated relation, mechanism having separate work gaging members automatically operable to periodically move said members to simultaneously gage different work pieces carried by the carrier and to eject one work piece, if oversized, and another work piece, if undersized, from the carrier, and means for imparting step-by-step movements to said carrier to successively advance work pieces to gaging positions.

38. In a machine of the class described, a work carrier having successively positioned work carrying elements for simultaneously carrying work pieces, mechanism having separate gaging members and automatically operable to periodically move said members to gage work pieces carried by separate carrying elements, one member operating to eject a work piece with which it coacts if the work piece is oversized, and another of said members operating to eject a work piece with which it coacts if the work piece is undersized, and means for imparting step-by-step movements to said carrier to successively advance said elements first to oversize gaging position and then to undersize gaging position.

39. In a machine of the class described, an endless carrier having a plurality of successively arranged work carrying members, a plurality of gage slides operable to simultaneously act on work pieces carried by different of said carrier members, one of said slides to eject a work piece, if oversized, from its carrier member, and another to eject a work piece, if undersized, from its carrier member, means automatically operable to control the movements of said slides and to permit yielding work gaging and ejecting movements and impart positive retracting movements thereto, means for imparting step-by-step movements to said carrier to successively advance its work carrying members to and from the respective gaging positions, and means automatically operable to engage and hold work pieces to the carrier members when in gaging positions and during predetermined portions of the gaging operations.

40. In a machine of the class described, a work carrier, means for imparting advancing movements to said carrier, a gage slide reciprocally movable to gage a work piece carried by the carrier and to eject the work piece, if oversized, from the carrier, means yieldingly urging a work gaging and ejecting movement of said gage slide, and means having pin and slot connection with said slide and automatically operable to periodically permit work gaging and ejecting strokes thereof and then to retract the slide.

41. In a machine of the class described, an endless work carrier having outwardly projecting carrier arms and adapted to have its carrier arms successively pick up work pieces from positions subjacent thereto and elevate the same, means for imparting step-by-step movements to the carrier, and means movable to gage the size of a work piece when at a predetermined point of movement with the carrier and to eject the work pieces, if oversized, from the carrier.

42. In a machine of the class described, an endless work carrier having outwardly projecting carrier arms and adapted to have its carrier arms successively pick up work pieces from positions subjacent thereto and elevate the same, means for imparting step-by-step movements to the carrier, means movable to gage the size of a work piece when at a predetermined point of movement with the carrier and to eject the work, if undersized, from the carrier.

43. In a machine of the class described, a work carrier, means for intermittently advancing the carrier, a work holding finger, and means automatically operable to operate said finger to engage and hold a work piece to said carrier at each rest period thereof and then to release the same.

44. In a machine of the class described, a work carrier, means for intermittently advancing the carrier, a work holding finger mounted for rocking movements, a rotating cam, and means operated by said cam to move said finger to engage and hold work pieces to the carrier during a rest period thereof and then to move the finger to released position to permit an ejection of the work piece or an advancing movement thereof with the carrier.

45. In a machine of the class described, a work carrier having a work carrying rocker arm, means for moving said carrier to advance said arm, means for preventing a rocking of the carrier arm except at a predetermined point in its movement with the carrier, and weighing mechanism coacting with the carrier arm only at its rocking position to prevent a work dumping rocking movement thereof if the work piece carried thereby is under a predetermined weight.

46. In a machine of the class described, a work carrier having a work carrying rocker arm, means for moving said carrier to advance said arm, means for preventing a rocking of the carrier arm except at a predetermined point in its movement with the carrier, and weighing mechanism coacting with the carrier arm at its rocking position to prevent a work dumping rocking movement thereof if the work piece carried thereby is under a predetermined weight, and means for positively returning the rocker arm to normal work carrying position after dumping a work piece.

47. In a machine of the class described, a work carrier having a work carrying rocker arm, means for moving said carrier to advance said arm, means for preventing a rocking of the carrier arm except at a predetermined point in its movement with the carrier, and weighing mechanism coacting with the carrier arm at its rocking position to prevent a work dumping rocking movement thereof if the work piece carried thereby is under a predetermined weight, and means for preventing a rocking of said arm when in weighing position and automatically operable to periodically release the arm to permit a work dumping movement thereof.

48. In a machine of the class described, a work carrier having a work carrying rocker arm, means for moving said carrier to advance said arm, means for preventing a rocking of the carrier arm except at a predetermined point in its movement with the carrier, and weighing mechanism coacting with the carrier arm at its rocking position to prevent a work dumping rocking movement thereof if the work piece carried thereby is under a predetermined weight, and means for preventing a rocking of said arm when in weighing position and automatically operable to periodically release the arm to permit a work dumping movement thereof and then to positively return the arm to its working carrying position.

49. In a machine of the class described, an endless carrier having a work carrying rocker arm, means for holding said arm in one position relative to the carrier except when the arm is in weighing position, and weighing means with which the rocker arm connects when in weighing position adapted to exert a predetermined force on said arm to resist a gravity rocking thereof.

50. In a machine of the class described, an endless carrier having a work carrying rocker arm, means for holding said arm in one position relative to the carrier except when the arm is in weighing position, weighing means with which the rocker arm connects when in weighing position adapted to exert a predetermined force on said arm to resist a gravity rocking thereof, and means for preventing a rocking of said arm when in weighing position and periodically operable to permit work actuated gravity movements thereof to discharge a work piece of predetermined weight.

51. In a machine of a class described, an endless carrier, means for imparting intermittent advancing movements thereto, a work carrying rocker arm on said carrier, a guide for preventing rocking movements of said arm relative to the carrier except when the arm is in weighing position, and weighing mechanism which coacts with the arm when in weighing position to exert a predetermined force on said arm to resist a gravity rocking thereof to dump a work piece carried thereby.

52. In a machine of the class described, an endless carrier, means for imparting intermittent advancing movements thereto, a work carrying rocker arm on said carrier, a guide for preventing rocking movements of said arm relative to the carrier except when the arm is in weighing position, weighing means which coacts with the arm when in weighing position to exert a predetermined force on said arm to resist a gravity rocking thereof to dump a work piece carried thereby, and means having a reciprocably movable member adapted to prevent a rocking of the rocker arm when in weighing position and periodically operable to permit a gravity rocking of the arm and then to return the arm to normal position.

53. In a machine of the class described, a frame having an endless guide-way with an opening in a wall thereof, a flexible conveyer guided for movements substantially in parallel relation to said guide-way, means for driving said conveyer, an arm carried by said conveyer for movements relative thereto and having a part coacting with said guide-way to permit such relative movements except when in register with said opening, means operable to periodically open and close said opening to permit movements of the arm part therein, and weighing means coacting with said arm to exert a predetermined force thereon to resist a movement thereof from normal work-holding position when in register with said opening.

54. In a machine of the class described, an endless carrier, a plurality of work carrying arms pivoted thereto, means for intermittently advancing said carrier, means forming an endless guide-way adjacent to said carrier and having an opening in a wall thereof, a pin projecting from each arm into said guide-way and coöperating therewith to prevent rocking movements of the respective arm except when in register with said opening, a slide in said opening adapted to close the same and prevent a movement of a pin therein, means for periodically moving said slide to open and close said opening, and means coacting with an arm when its pin is in register with said opening to exert a predetermined force on the arm to resist a movement of the pin in the opening and a consequent gravity rocking of the arm.

55. In a machine of the class described, an endless carrier having a plurality of work carrying rocker arms successively movable into weighing position by movements of the carrier, means for intermittently moving the carrier, means for preventing a rocking of each arm relative to the carrier except when in weighing position, means for preventing a rocking of each arm when in weighing position and periodically movable to permit such rocking, a weighing mechanism coacting with each arm when in weighing position and exerting a predetermined force on the arm to resist a rocking thereof under the weight of a work piece, and means for disconnecting said mechanism and an engaged arm to permit an advancing movement of the carrier.

56. In a machine of the class described, an endless carrier, means for imparting intermittent advancing movements thereto, a work supporting arm carried for rocking movements by said carrier, means for preventing rocking movements of said arm relative to the carrier except when in weighing position, and a weighing lever coacting with said arm when in weighing position to exert a predetermined force thereon to resist a rocking thereof.

57. In a machine of the class described, an endless carrier, means for imparting intermittent advancing movements thereto, a work supporting arm carried for rocking movements by said carrier, means for preventing rocking movements of said arm relative to the carrier except when in weighing position, a weighing lever coacting with said arm when in weighing position to exert a predetermined force thereon to resist a rocking thereof, and means for coacting with said arm when in weighing position to permit a gravity rocking thereof and then to return the arm to normal position.

58. In a machine of the class described, an endless carrier, means for imparting intermittent advancing movements thereto, a work supporting arm carried for rocking movements by said carrier, means for preventing rocking movements of said arm relative to the carrier except when in weighing position, a weighing lever coacting with said arm when in weighing position to exert a predetermined force thereon to resist a rocking thereof, and means operable to periodically move said weighing lever out of arm coacting position to permit advancing of the arm with the carrier.

59. In a machine of the class described, an endless carrier, means for imparting intermittent advancing movements thereto, a work supporting arm carried for rocking movements by said carrier, means for preventing rocking movements of said arm relative to the carrier except when in weighing position, a weighing lever coacting with said arm when in weighing position to exert a predetermined force thereon to resist a rocking thereof, and means for coacting with said arm when in weighing position to permit a gravity rocking thereof and then to return the arm to normal position, and means operable to periodically move said weighing lever out of arm coacting position to permit advancing of the arm with the carrier.

60. In a machine of the class described, an endless conveyer, a work carrying rocker arm, means for moving said conveyer, means for preventing rocking movements of said arm relative to the conveyer except when in weighing position, weighing means coacting with said arm when in weighing position to resist a gravity rocking thereof and periodically operable to disengage the rocker arm.

61. In a machine of the class described, an endless conveyer, a work carrying rocker arm, means for moving said conveyer, means for preventing rocking movements of said arm relative to the conveyer except when in weighing position, weighing means coacting with said arm when in weighing position to resist a gravity rocking thereof and periodically operable to disengage the rocker arm, and means operable to permit said rocker arm to have gravity rocking movements when in weighing position and then to return it to normal position.

62. In a machine of the class described, a conveyer having a work carrying rocker arm, means for preventing rocking movements of said arm relative to the conveyer except when at a predetermined point in its movement, a weighing lever operable to coact with said arm when in rocking position and to resist a work actuated gravity rocking movement thereof, a cam shaft, means for driving said shaft in synchronism with the driving of said conveyer, and means actuated by a rotation of said shaft to periodically disconnect said weighing lever from said rocker arm.

63. In a machine of the class described, a conveyer having a work carrying rocker arm, means for imparting movements to said conveyer, means for preventing rocking movements of said arm relative to the conveyer except when at a predetermined point in its movement, a weighing lever operable to coact with said arm when in rocking position to resist a work actuated gravity rocking movement thereof, a cam shaft, means for driving said shaft in synchronism with the driving of said conveyer, means actuated by a rotation of said shaft to periodically disconnect said weighing lever from said rocker arm, and means automatically operable to permit said rocker arm to have gravity rocking movements when in rocking position and then to return it to normal position.

64. In a machine of the class described, a conveyer having a plurality of work carrying rocker arms, means for imparting step-by-step movements to said conveyer to successively place its rocker arms in weighing position, means coacting with said rocker arms to prevent rocking movements thereof except when in weighing position, weighing means releasably coacting with each arm when in weighing position to offer a predetermined resistance to a work actuated gravity rocking of the arm, and means operable to release the weighing means from an engaged rocker arm prior to an advancing movement thereof and then to return to position to engage the next rocker arm in order.

65. In a machine of the class described, a conveyer having a rocker arm, means for imparting movements to said conveyer, means for preventing gravity rocking movements of said arm except when at a predetermined point in its movement, a weighing shaft, a lever carried by said shaft for transverse rocking movements therewith and longitudinal rocking movements relative thereto, said lever coacting with said arm when in permissible rocking position to resist a work actuated gravity rocking of said arm, said lever normally standing in arm coacting position, and means for periodically rocking the lever longitudinally of its shaft to release said arm.

66. In a machine of the class described, a conveyer having a rocker arm, means for imparting movements to said conveyer, means for preventing gravity rocking movements of said arm except when at a predetermined point in its movement, a weighing shaft, a lever carried by said shaft for transverse rocking movements therewith and longitudinal rocking movements relative thereto, said lever coacting with said arm when in permissible rocking position to resist a work actuated gravity rocking of said arm, said lever normally standing in arm coacting position, and means for periodically rocking the lever longitudinally of its shaft to release said arm, and means operable to permit a gravity rocking of the rocker arm when in rocking position and then to return it to normal position.

67. In a machine of the class described, a conveyer having a plurality of work carrying rocker arms, means for imparting step-by-step movements to said conveyer, means coacting with said arms to prevent rocking movements thereof relative to the conveyer except when at predetermined points in their movements, and separate weighing means for successively and simultaneously acting on different arms of the conveyer, each to offer a different predetermined resistance to a work actuated gravity rocking of the arm with which it engages.

68. In a machine of the class described, a conveyer having a plurality of work carrying arms each adapted to have gravity rocking work dumping movements when at a predetermined point in its movement with the conveyer, means for intermittently moving the conveyer to successively place its arms in rocking position, and means for acting on each arm when in weighing position to offer a predetermined resistance to a work dumping movement thereof.

69. In a machine of the class described, a conveyer having a plurality of work carrying arms each adapted to have gravity rocking work dumping movements when at a predetermined point in its movement with the conveyer, means for intermittently moving the conveyer to successively place its arms in rocking position, and means for acting on each arm when in weighing position to offer a predetermined resistance to a work dumping movement thereof, and means for moving said resisting means to disengage a registering conveyer arm prior to and during at least a portion of each advancing movement of the conveyer.

70. In a machine of the class described, an intermittently movable endless conveyer having a plurality of work carrying arms adapted to have work actuated gravity rocking movements when at predetermined points in their movements with the conveyer, separate weighing means for successively and simultaneously acting on different arms of the conveyer, when in permissible rocking positions, each to offer a predetermined resistance to a work actuated gravity rocking of the arm with which it coacts, and means periodically operable to disengage said weighing means and the arms which they engage prior to and during at least a portion of each advancing movement of the conveyer.

71. In a machine of the class described, an endless conveyer having a work carrying rocker arm, means for normally retaining the rocker arm in one position relative to the conveyer and to permit it to have a work dumping gravity rocking movement when at a predetermined point in its movement, and means for imparting movements to said conveyer.

72. In a machine of the class described, a conveyer having a work carrying arm, means for maintaining said arm in one position relative to the conveyer and permitting a work actuated gravity rocking thereof when at a predetermined point in its movement, means operable when the arm is in one position of its movement to gage the size of a work piece and, if oversize, to eject it from the conveyer, and means operable on said arm when in permissible rocking position to offer a predetermined resistance to a work dumping gravity rocking thereof.

73. In a machine of the class described, a conveyer having a work carrying arm, means for maintaining said arm in one position relative to the conveyer and permitting a work actuated gravity rocking thereof when at a predetermined point in its movement, means operable when the arm is in one position of its movement to gage the size of a work piece and, if undersize, to eject it from the conveyer and means operable on said arm when in permissible rocking position to offer a predetermined resistance to a work dumping gravity rocking thereof.

74. In a machine of the class described, an endless conveyer having a work carrying arm, means for imparting intermittent arm advancing movements to said conveyer, means coacting with the arm to normally maintain it in one position relative to the conveyer and to permit a work dumping gravity rocking movement thereof when at a predetermined point in its movement, means periodically operable to act on a work piece when in one position of its movement with the conveyer arm to gage its size and, if oversize, to eject it from the arm and to act on a work piece when in another position of its movement with the arm to gage its size and, if undersize, to eject it from the arm, and means coacting with the arm when in rocking position to offer a predetermined resistance to a gravity rocking of the arm.

75. In a machine of the class described, an endless conveyer having a plurality of work carrying rocker arms, means normally maintaining each of said arms in one position relative to the conveyer, and to permit work actuated gravity rocking movements of each arm when at a predetermined point of its movement with the conveyer, means for imparting intermittent arm advancing movements to said conveyer, means operable to act on the work pieces carried by two different arms to gage both and to eject one if oversize and the other if undersize from its carrying arm, and means coacting with each rocker arm when in its rocking position to offer a predetermined resistance to a work actuated gravity rocking of the arm to dump the work piece therefrom.

76. In a machine of the class described, an endless conveyer having a plurality of work carrying rocker arms, means for imparting intermittent advancing movements to said conveyer, means normally maintaining each arm in one position relative to the conveyer and permitting a work dumping gravity rocking thereof when in different predetermined points in its movement, means operable on two different work pieces carried by successive arms at each rest period of the conveyer to gage the work pieces and to eject one if oversize and the other if undersize from the respective arms, and separate means for coacting with each arm when in different rocking positions to prevent a work dumping gravity rocking of the arms when the work carried thereby is under different predetermined weights.

77. In a machine of the class described, an endless conveyer having a plurality of work carrying rocker arms, means for imparting intermittent advancing movements to said conveyer, means normally maintaining each arm in one position relative to the conveyer and permitting a work dumping gravity rocking thereof when in different predetermined points in its movement, means operable on two different work pieces carried by successive arms at each rest period of the conveyer to gage the work pieces and to eject one if oversize and the other if undersize from the respective arms, and separate means for coacting with each arm when in different rocking positions to prevent a work dumping gravity rocking of the arms when the work carried thereby is under different predetermined weights, and means operable to return each arm in normal position after a work dumping movement thereof.

78. In a machine of the class described, means for advancing an article, and mechanism automatically movable to act on the advancing article at a predetermined point in its movement to gage its size and, if the article is oversize, to positively eject it from said means.

79. In a machine of the class described, means for advancing an article, and mechanism automatically movable to act on the article at a predetermined point in its advancing movement to gage its size and, if the article is undersize, to positively eject it from said means.

80. In a machine of the class described, means for advancing an article, and mechanism automatically movable to act on the article at a predetermined point in its advancing movement to gage its size and, if the article is oversize, to positively eject it from said means, said mechanism including a reciprocally movable article gaging and ejecting member.

81. In a machine of the class described, means for advancing an article, and mechanism automatically movable to act on the article at a predetermined point in its advancing movement to gage its size and, if the article is undersize, to positively eject it from said means, said mechanism including a reciprocally movable article gaging and ejecting member.

82. In a machine of the class described, means operable to advance a workpiece, a gage member movable to engage a workpiece at a predetermined point in its advancing movement and to eject the work, if oversize, from said means, and means for imparting operating movements to said member.

83. In a machine of the class described, means operable to advance a workpiece, a gage member movable to engage a work piece at a predetermined point in its advancing movement and to eject the work, if undersize, from said means, and means for imparting operating movements to said member.

84. In a machine of the class described, means operable to advance a workpiece, a gage member operable to engage a workpiece at a predetermined point in its advancing movement and to eject the work, if oversize, from said means, means for imparting yielding work gaging and ejecting movements to said member, and means for retracting the member from gaging and ejecting position.

85. In a machine of the class described, means operable to advance a workpiece, a gage member operable to engage a workpiece at a predetermined point in its advancing movement and to eject the work, if undersize, from said means, means for imparting yielding gaging and ejecting movements to said member, and means for retracting the member from gaging and ejecting position.

86. In a machine of the class described, means for advancing an article, mechanism automatically operable to act on the advancing article at a predetermined point in its movement to gage its size and, if the article is oversize, to positively eject it from said means, and means coacting with the advancing means to hold the work during the gaging operation.

87. In a machine of the class described, means for advancing an article, mechanism automatically operable to act on the advancing article at a predetermined point in its movement to gage its size and, if the article is undersize, to positively eject it from said means, and means coacting with the advancing means to hold the work during the gaging operation.

88. In a machine of the class described, means for advancing an article, mechanism automatically operable to act on the advancing article at a predetermined point in its movement to gage its size and, if the article is oversize, to positively eject it from said means, said mechanism including a reciprocally movable article gaging and ejecting member, and means coacting with the advancing means to hold the work during the gaging operation.

89. In a machine of the class described, means for advancing an article, mechanism automatically operable to act on the advancing article at a predetermined point in its movement to gage its size and, if the article is undersize, to positively eject it from said means, said mechanism including a reciprocally movable article gaging and ejecting member, and means coacting with the advancing means to hold the work during gaging operation.

90. In a machine of the class described, means supporting an article to be gaged, a gage member reciprocally movable to gage an article supported by said means, and means guiding the reciprocatory movements of said member and permitting it to have movements transverse to its reciprocatory movements during a portion of said latter movements.

91. In a machine of the class described, means supporting an article to be gaged, a gage member guide for reciprocatory movements and capable of movements which are transverse to its reciprocatory movements when in engagement with the article being gaged and means for operating said member.

92. In a machine of the class described, means supporting an article to be gaged, a reciprocally movable article gaging member having a gage notch, means guiding the reciprocatory movements of said member and permitting it to have movements transverse to its reciprocatory movements when in engagement with an article being gaged, and means operating said member.

93. In a machine of the class described, means supporting an article to be gaged, a reciprocally movable gage member having an extending article engaging nose and a gage notch under the rear portion of said nose, means for guiding the reciprocatory movements of said member and means for operating said member.

94. In a machine of the class described, means supporting an article to be gaged, a reciprocally movable gage member having an extending article engaging nose and a gage notch under the rear end portion of said nose, means for guiding the reciprocatory movement of said member and permitting it to have movements transverse to its reciprocatory movements when its nose is engaged over the article, and means for operating said member.

95. In a machine of the class described, means for supporting an article to be gaged, a gage member guided for reciprocatory movements, and means operable to impart yielding article engaging movements to said member and then to retract it.

96. In a machine of the class described, means supporting an article to be gaged, a gage member, means guiding the movements of said member and permitting its article gaging portion to have movements in intersecting planes when in article gaging position, and means for moving said member into and out of gaging positions.

97. In a machine of the class described, means supporting an article to be gaged, a gage member, means guiding the movement of said member and permitting its article gaging portion to have movements in intersecting planes when in article gaging position, and means for imparting yielding article gaging movements to said member and then to retract it.

98. In a machine of the class described, means for supporting an article to be gaged, a reciprocally movable gage member having a gage notch therein, and means operable to impart a yielding gage movement to said member and, if its gage notch receives an article, to cause the inner end wall of said notch to coact with the article to eject it from the supporting means.

99. In a machine of the class described, means supporting an article to be gaged, a reciprocally movable gage member having a gage notch therein, means operable to impart yielding gaging movements to said member and, if its gage notch receives an article, to cause the inner end wall of said notch to coact with the article to eject it from the supporting means, and means for guiding the movements of said member and permitting it to have transverse article ejecting movements after its notch has received an article.

100. In a machine of the class described, means supporting an article to be gaged, a gage member having guide elements projecting therefrom, a guide for said member having a guide way in which said elements work and which permits the gage member to have movements transverse to its article gaging movements during a predetermined portion of its movements, and means for operating said member.

101. In a machine of the class described, means supporting an article to be gaged, a gage member having guide elements projecting therefrom, a guide for said member having a guide way in which said elements work and which permits the gage member to have movements transverse to its article gaging movements during a predetermined portion of its movements, and means for imparting a yielding article gaging and ejecting movement to said member and then to retract it.

102. In a machine of the class described, an article support having a recessed article seat in its top portion, a gage member having an article receiving gage notch, means operable to reciprocate said member to gage an article and, if the article is oversize, to eject it from the supporting means and then to return it to inoperative position, and means guiding the movement of said member and permitting it to have movements transverse to its gaging movements during a predetermined portion of its movement to eject an article, if oversize, upward and outward from its seat.

103. In a machine of the class described, an article support having a recessed article seat in its top portion, a gage member having an article receiving gage notch, means operable to reciprocate said member to gage an article and, if the article is under a predetermined size, to eject it from the supporting means and then to return it to inoperative position, and means guiding the movement of said member and permitting it to have movements transverse to its gaging movements during a predetermined portion of its movement to eject an article, if under a predetermined size, upward and outward from its seat.

104. In a machine of the class described, an article support having a recessed article seat in its top portion, a gage member having an article receiving gage notch, means operable to yieldingly move said member to gage an article and, if the article is under a predetermined size, to eject it from the supporting means, and then to return it to inoperative position, and means guiding the movement of said member and permitting it to have movements transverse to its gaging movements after an article has been received by the member notch to permit the article to be ejected upward and outward from its seat.

105. In a machine of the class described, an article support having a recessed article seat in its top portion, a gage member having an article receiving gage notch, means operable to reciprocate said member to gage an article and, if the article is oversize, to eject it from the supporting means and then to return it to inoperative position, and means guiding the movements of said member and permitting it to have movements transverse to its gaging movements during a predetermined portion of its movement to eject an article, if oversize, upward and outward from its seat and to permit said member to lower when the article has passed beyond its support, whereby the support coacts with and strips the article from the member upon a retracting movement of the latter.

106. In a machine of the class described, and article support having a recessed article seat in its top portion, a gage member having an article receiving gage notch, means operable to reciprocate said member to gage an article and, if the article is under a predetermined size, to eject it from the supporting means and then to return to inoperative position, and means guiding the movements of said member and permitting it to have movements transverse to its gaging movements during a predetermined portion of its movement to eject an article, if under a predetermined size, upward and outward from its seat and to permit said member to lower when the article has passed beyond its support, whereby the support coacts with and strips the article from the member upon a retracting movement of the latter.

107. In a machine of the class described, and article support having a recessed article seat in its top, a gage member having an article receiving gage notch, means operable to yieldingly move said member to gage an article and, if the article is under a predetermined size, to eject it from the supporting means and then to return to inoperative position, and means guiding the movements of said member and permitting it to have movements transverse to its gaging movements after an article has been received by the member notch to permit the article to be ejected upward and outward from its seat, and to permit said member to lower when the article has passed beyond its support, whereby the support coacts with and strips the article from the member upon a retracting movement of the latter.

108. In a machine of the class described, a work support, a reciprocally movable gage member operable during one stroke thereof to gage a workpiece carried by said support and, if the work piece is undersize, to eject it from the support, and means automatically operable to control the movement of said gage member and to impart yielding work gaging and ejecting strokes and positive retracting strokes thereto, the gaging and ejecting strokes of said member being stopped by its engagement with an oversize workpiece.

109. In a machine of the class described, an article support, a gage member reciprocally movable to gage an article carried by said support and, if the article is oversize, to eject it from the support, means for operating said member, and means operable to hold an article and the support during a predetermined portion of the article gaging movement of said member and then to release it to permit its ejection by the member.

110. In a machine of the class described, an article support, a gage member reciprocally movable to gage an article carried by said support and, if the article is under a predetermined size, to eject it from the support, means for operating said member, and means operable to hold an article and the support during a predetermined portion of the article gaging movement of said member and then to release it to permit its ejection by the member.

111. In a machine of the class described, a work carrier, means for imparting step by step advancing movements to said carrier, means automatically operable to engage and hold a workpiece to the carrier during a portion of an at-rest period thereof and to release the workpiece prior to the advancing movement of the carrier and to remain in released position during such movement, and mechanism automatically operable to gage a workpiece on the carrier during a rest period thereof and to eject it therefrom if oversize.

112. In a machine of the class described, a work carrier, means for imparting step by step advancing movements to said carrier, means automatically operable to engage and hold a workpiece to the carrier during a portion of an at-rest period thereof and to release the workpiece prior to the advancing movement of the carrier and to remain in released position during such movement, and mechanism automatically operable to gage a workpiece on the carrier during a rest period thereof and to eject it therefrom if undersize.

113. In combination, a movable work carrier having a pivoted work carrying member, means preventing a pivotal work dumping movement of said member except at a predetermined point in its movement with the carrier, and weighing means coacting with said member only at its dumping position to offer a predetermined resistance to the work-dumping movement thereof, the pivotal movement of said member being transverse to the movements of the carrier.

114. In combination, a vertically movable work carrier having a work carrying arm mounted for vertical work dumping movements, means preventing said arm from having a dumping movement except when at a predetermined point in its movement with the carrier, and weighing means coacting with said arm when in dumping position to offer a predetermined resistance to a work dumping movement thereof.

115. In combination, a movable carrier having a pivoted work carrying arm, means preventing a pivotal work dumping movement of said arm except at a predetermined point in its movement with the carrier and a weighing lever coacting with said arm when in dumping position and exerting a predetermined force thereon to resist a work dumping movement of the arm.

116. In combination, a movable carrier having a pivoted work carrying arm, means for imparting intermittent advancing movements thereto, means preventing pivotal work dumping movements of said arm except at a predetermined point in its movement with the carrier, a weighing lever coacting with said arm when in dumping position and exerting a predetermined force thereon to resist a work dumping movement of the arm, and means operable to periodically move said lever out of arm coacting position to permit an advancing of the arm with the carrier.

117. In combination, a conveyer having a work carrying arm adapted to have work actuated gravity rocking movements for dumping a workpiece therefrom, means preventing a rocking movement of the arm except when at a predetermined point in its movement with the conveyer, means for imparting movement to the conveyer, and means for preventing a rocking of the arm when in its permissible rocking position and operable to prevent such rocking and then to return the arm to work holding position.

118. In combination, a conveyer having a plurality of work carrying arms adapted to have work actuated gravity rocking work dumping movements when at predetermined points in their movements with the conveyer, separate weighing means for simultaneously acting on different conveyer arms when in permissible rocking positions, each to offer a predetermined resistance to a rocking of the arm with which it coacts, means for imparting intermittent advancing movements to the conveyer, and means operable to move the arm coacting members of the weighing means out of operative relation to the arms prior to and during a portion of each advancing movement of the conveyer.

119. In combination, an intermittently movable conveyer having a plurality of successively arranged work carrying rocker arms, means permitting a rocking of said arms relative to the conveyer except at a predetermined point in their movements therewith, and mechanism operable during rest periods of the conveyer to act on the work piece carried by one arm to gage its size and eject it therefrom, if oversize, and to act on the arm which is in permissible rocking position to offer a predetermined resistance to a work dumping rocking movement thereof.

120. In combination, an intermittently movable conveyer having a plurality of successively arranged work carrying rocker arms, means permitting a rocking of said arms relative to the conveyer except at a predetermined point in their movements therewith, and mechanism operable during rest periods of the conveyer to act on the work piece carried by one arm to gage its size and eject it therefrom, if undersize, and to act on the arm which is in permissible rocking position to offer a predetermined resistance to a work dumping rocking movement thereof.

121. In combination, an intermittently movable conveyer having a plurality of successively arranged work carrying rocker arms, means preventing a rocking of said arms relative to the conveyer except at predetermined points in their movements therewith, and mechanism operable during rest periods of the conveyer to act on the workpiece carried by one arm to gage its size and, if oversize, to eject it therefrom, and to act on different arms which are in permissible rocking positions to offer a predetermined resistance to work dumping rocking movements of each.

122. In combination, an intermittently movable conveyer having a plurality of successively arranged work carrying rocker arms, means preventing a rocking of said arms relative to the conveyer except at predetermined points in their movements therewith, and mechanism operable during rest periods of the conveyer to act on the workpiece carried by one arm to gage its size and, if undersize, to eject it therefrom, and to act on different arms which are in permissible rocking positions to offer a predetermined resistance to work dumping rocking movements of each.

In testimony whereof, I have hereunto signed my name to this specification.

EDWARD DANNER.